(12) United States Patent
Ishikawa

(10) Patent No.: US 8,177,158 B2
(45) Date of Patent: May 15, 2012

(54) REEL AND RECORDING TAPE CARTRIDGE

(75) Inventor: Ren Ishikawa, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 263 days.

(21) Appl. No.: 12/184,805

(22) Filed: Aug. 1, 2008

(65) Prior Publication Data

US 2009/0045279 A1    Feb. 19, 2009

(30) Foreign Application Priority Data

Aug. 17, 2007   (JP) ................................. 2007-212860

(51) Int. Cl.
*G11B 23/107* (2006.01)
*B65H 75/08* (2006.01)

(52) U.S. Cl. ..................................... 242/613.1; 242/348

(58) Field of Classification Search ................... 242/348, 242/348.2, 613, 613.4, 609.4, 608.8, 613.1, 242/613.2
See application file for complete search history.

(56) References Cited

U.S. PATENT DOCUMENTS

| | | | | |
|---|---|---|---|---|
| 1,408,463 | A * | 3/1922 | Lewis ......................... | 242/613.1 |
| 7,300,016 | B2 | 11/2007 | Brown et al. | |
| 7,571,872 | B2 * | 8/2009 | Shiga ........................... | 242/348 |
| 2005/0077409 | A1 * | 4/2005 | Brown et al. ................. | 242/348 |
| 2005/0145736 | A1 * | 7/2005 | Hiraguchi ..................... | 242/348 |
| 2006/0043227 | A1 * | 3/2006 | Iino et al. ...................... | 242/348 |

FOREIGN PATENT DOCUMENTS

| | | |
|---|---|---|
| JP | 62-080279 U | 5/1987 |
| JP | 08-297952 A | 11/1996 |
| JP | 2002-245745 A | 8/2002 |
| JP | 2005-116163 A | 4/2005 |

OTHER PUBLICATIONS

Notice of Reasons for Rejection, dated Oct. 26, 2010, issued in corresponding JP Application No. 2007-212860, 6 pages in English and Japanese.

* cited by examiner

*Primary Examiner* — William A Rivera
(74) *Attorney, Agent, or Firm* — Sughrue Mion, PLLC

(57) ABSTRACT

At a reel, an outer peripheral surface of a cylindrical tube portion of a reel hub is a tape winding surface around which a magnetic tape is wound. In a free state, the tape winding surface forms a substantial taper shape in which an outer diameter is greater at an upper end portion side where a radial direction rigidity is relatively low, than at a lower end portion side where the rigidity is high. In a state in which a magnetic tape is wound, the tape winding surface can form a shape that is substantially symmetrical with respect to a transverse direction of the magnetic tape. As a result, the reel and a recording tape cartridge are obtained in which the outer peripheral surface of the hub forms a proper shape in a state in which a recording tape is wound.

16 Claims, 15 Drawing Sheets

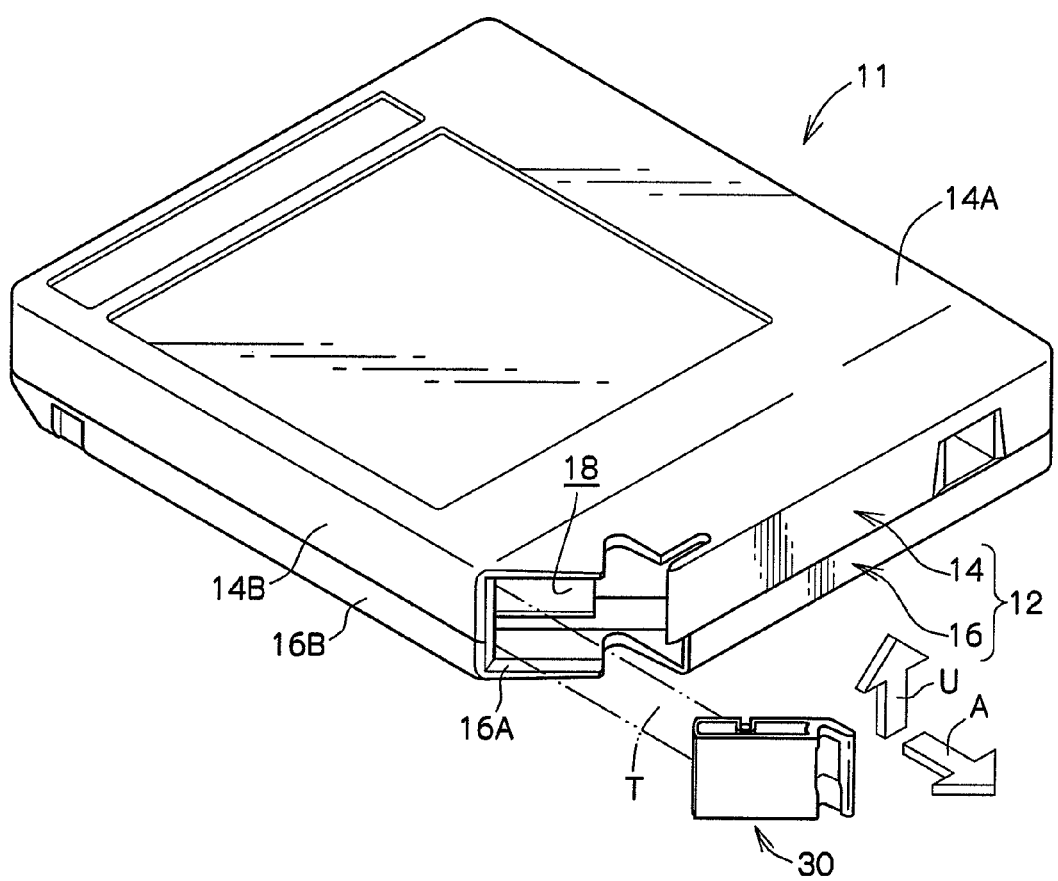

REEL AND RECORDING TAPE CARTRIDGE

CROSS-REFERENCE TO RELATED APPLICATION

This application claims priority under 35 USC 119 from Japanese Patent Application No. 2007-212860, the disclosure of which is incorporated by reference herein.

BACKGROUND OF THE INVENTION

1. Field of the Invention

The present invention relates to a reel on which a recording tape, such as a magnetic tape or the like, is wound, and to a recording tape cartridge that accommodates, within a case, a reel on which a magnetic tape is wound.

2. Description of the Related Art

There are known tape reels in which the reel hub is formed in an hourglass shape in order to prevent a magnetic tape which is traveling from slipping in the transverse direction (see, for example, Japanese Patent Application Laid-Open (JP-A) No. 8-297952). Further, there are known reels that have a winding core portion whose outer diameter is formed to be larger at the tape edge side which is the reference for the traveling of the magnetic tape, in order to make the PES (the standard deviation of the positional offsets) and the amount of off-track small (see, for example, JP-A No. 2002-245745). Moreover, a technique is known of providing a cylindrical-tube-shaped, metal insertion portion at a hub that is formed of resin and on which a magnetic tape is wound (see, for example, JP-A No. 2005-116163).

However, the magnetic tapes disclosed in JP-A Nos. 8-297952 and 2002-245745 do not take into consideration deformation of the hub due to the winding pressure of the magnetic tape. Further, although the magnetic tape disclosed in JP-A No. 2005-116163 takes suppressing of deformation of the hub into consideration, the shape of the hub after winding of the magnetic tape is not considered. The shape of the hub on which the magnetic tape is wound affects the curving (curvature) of the magnetic tape in the transverse direction.

SUMMARY OF THE INVENTION

In view of the aforementioned, the present invention relates to obtaining a reel in which the outer peripheral surface of a hub forms a proper shape in a state in which a recording tape is wound, and to a recording tape cartridge.

A reel relating to a first aspect of the present invention has: a hub formed in a cylindrical tube shape, and having an outer peripheral surface for winding of a recording tape; and a reinforcing ring for reinforcing the hub, the reinforcing ring being formed in a cylindrical tube shape and mounted at the hub, wherein the outer peripheral surface of the hub is formed so as to, in a state in which a recording tape is wound, form a shape that is symmetrical with respect to a central portion in a transverse direction of the recording tape.

In the reel of the above-described first aspect of the present invention, in a state in which a recording tape is wound on the hub, the outer peripheral surface of the hub (the tape winding surface) forms a shape that is substantially symmetrical with respect to the central portion in the transverse direction of the recording tape. Therefore, it is difficult for deformation to arise at the wound recording tape. In particular, because the reinforcing ring is mounted at the hub of the present reel, the proper shape of the outer peripheral surface of the hub is easily maintained regardless of the storage environment of the reel on which the recording tape is wound, and it is difficult for deformation of the recording tape due to storage to arise.

In this way, in the reel of the first aspect of the present invention, the outer peripheral surface of the hub forms a proper shape in a state in which a recording tape is wound.

In a reel relating to a second aspect of the present invention, a cylindrical-tube-shaped reinforcing ring is mounted at a hub that is formed in a cylindrical tube shape, and, in a state in which a recording tape is wound, diameters of portions of the outer peripheral surface of the hub, which portions contact both transverse direction ends of the recording tape, substantially coincide.

In the reel of the second aspect of the present invention, in the state in which a recording tape is wound around the hub, the outer diameters (radial direction positions) of the portions of the outer peripheral surface of the hub (the tape winding surface), which portions contact the transverse direction both ends of the recording tape, substantially coincide. Therefore, it is difficult for deformation to arise at the wound recording tape. In particular, because the reinforcing ring is mounted at the hub of the present reel, the proper shape of the outer peripheral surface of the hub is easily maintained regardless of the storage environment of the reel on which the recording tape is wound, and it is difficult for deformation of the recording tape due to storage to arise.

In this way, in the reel of the second aspect of the present invention, the outer peripheral surface of the hub forms a proper shape in a state in which a recording tape is wound.

A reel relating to a third aspect of the present invention has a hub formed in a cylindrical tube shape for winding of a recording tape on an outer periphery thereof, and a reinforcing ring for reinforcing the hub, the reinforcing ring being formed in a cylindrical tube shape and mounted at the hub, wherein, at the hub, outer diameters at respective portions in an axial direction differ in a free state such that, in a state in which a recording tape is wound on the outer periphery, the outer peripheral surface forms a shape that is symmetrical with respect to a central portion in a transverse direction of the recording tape.

In the reel of the third aspect of the present invention, because the dimensions of respective axial direction portions of the hub differ as described above, the outer peripheral surface of the hub (the tape winding surface) forms a shape that is substantially symmetrical with respect to the transverse direction central portion of the recording tape, in the state in which the recording tape is wound on the hub. Therefore, it is difficult for deformation due to the shape of the hub to arise at the recording tape that is wound on the hub of the present reel. In particular, because the reinforcing ring is mounted at the hub of the present reel, the proper shape of the outer peripheral surface of the hub is easily maintained regardless of the storage environment of the reel on which the recording tape is wound, and it is difficult for deformation of the recording tape due to storage to arise.

In this way, in the reel of the third aspect of the present invention, the outer peripheral surface of the hub forms a proper shape in a state in which a recording tape is wound.

A reel relating to a fourth aspect of the present invention has a hub formed in a cylindrical tube shape for winding of a recording tape on an outer periphery thereof, and a reinforcing ring for reinforcing the hub, the reinforcing ring being formed in a cylindrical tube shape and mounted at the hub, wherein outer diameters of respective portions of the hub in an axial direction differ in a free state such that, in a state in which a recording tape is wound on the outer periphery of the hub, outer diameters of one axial direction end portion and another axial direction end portion coincide.

In the reel of the fourth aspect of the present invention, the dimensions of respective portions in the axial direction of the hub differ as described above. Therefore, in the state in which a recording tape is wound around the hub, the outer diameters (radial direction positions) of the portions of the outer peripheral surface of the hub (the tape winding surface), which portions contact the transverse direction both ends of the recording tape, substantially coincide. Thus, it is difficult for deformation due to the shape of the hub to arise at the recording tape that is wound on the hub of the present reel. In particular, because the reinforcing ring is mounted at the hub of the present reel, the proper shape of the outer peripheral surface of the hub is easily maintained regardless of the storage environment of the reel on which the recording tape is wound, and it is difficult for deformation of the recording tape due to storage to arise.

In this way, in the reel of the fourth aspect of the present invention, the outer peripheral surface of the hub forms a proper shape in a state in which a recording tape is wound.

A reel relating to a fifth aspect of the present invention has a hub formed in a cylindrical tube shape for winding of a recording tape on an outer periphery thereof, and a reinforcing ring for reinforcing the hub, the reinforcing ring being formed in a cylindrical tube shape and mounted at the hub, wherein the outer peripheral surface of the hub at which the reinforcing ring is mounted is formed in a shape in which, in a state in which a recording tape is not wound, an outer diameter at an axial direction side where the radial direction rigidity is low is greater than an outer diameter at a side where the radial direction rigidity is high.

In the reel of the fifth aspect of the present invention, at the hub, the outer diameter is greater at the side, in the axial direction of the hub, where the radial direction rigidity is low than at the side where the radial direction rigidity is high. Thus, when a recording tape is wound, the hub deforms in a direction in which the difference in the outer diameters decreases. Therefore, the outer peripheral surface of the hub of the present reel, in a state in which a recording tape is wound, can be made to be substantially symmetrical with respect to the transverse direction central portion of the tape, and the outer diameters (the radial direction positions) of the portions thereof that contact the both transverse direction ends of the recording tape can be made to substantially coincide. As a result, it is difficult for deformation due to the shape of the hub to arise at the recording tape that is wound on the hub of the present reel. In particular, because the reinforcing ring is mounted at the hub of the present reel, the proper shape of the outer peripheral surface of the hub is easily maintained regardless of the storage environment of the reel on which the recording tape is wound, and it is difficult for deformation of the recording tape due to storage to arise.

In this way, in the reel of the fifth aspect of the present invention, the outer peripheral surface of the hub forms a proper shape in a state in which a recording tape is wound.

In the reels of the first through fifth aspects of the present invention, the hub may be structured such that a radial direction rigidity of one axial direction side of the hub is lower than a radial direction rigidity of another axial direction side of the hub, and the hub may have an outer peripheral surface that is formed in a taper shape in which an outer diameter is greater at the one axial direction side than at the other axial direction side.

In the reel of the above-described structure, due to a recording tape being wound on the outer peripheral surface of the hub that is formed in a taper shape, the side in the axial direction of the hub where the radial direction rigidity is low deforms more than the side where the radial direction rigidity is high. In this way, a structure is realized in which, in the state in which a recording tape is wound, the outer peripheral surface of the hub of the present reel is made to be substantially symmetrical with respect to the central portion in the transverse direction of the tape, or the outer diameters (the radial direction positions) of the portions thereof that contact the both transverse direction ends of the recording tape are made substantially coincide, and further, the difference in the outer diameters at respective portions in the axial direction of the hub is small (there is no portion where the outer diameter changes suddenly).

In the reels of the first through the fifth aspects of the present invention, the hub may be formed of a resin material, and the reinforcing ring may be formed of a metal material.

In the reel of the above-described structure, because creeping deformation of the resin hub is suppressed by the metal reinforcing ring, the proper shape of the outer peripheral surface of the hub is maintained even after storage in an environment conducive to creeping. In this way, deformation of the recording tape is effectively suppressed even after storage in an environment conducive to creeping.

A recording tape cartridge of a sixth aspect of the present invention has: the reel of the first aspect in which the recording tape is wound around an outer periphery of the hub; and a case rotatably accommodating the reel.

In the recording tape cartridge of the sixth aspect of the present invention, because the hub around which the recording tape is wound forms a proper shape, curving of the recording tape in the transverse direction is suppressed. Traveling of the recording tape is thereby stable.

As described above, the reel and recording tape cartridge relating to the present invention have the excellent effect that an outer peripheral surface of a hub forms a proper shape in a state in which a recording tape is wound.

BRIEF DESCRIPTION OF THE DRAWINGS

FIGS. 7A and 7B are drawings showing the recording tape cartridge relating to the exemplary embodiment of the present invention, where FIG. 7A is a perspective view seen from above and FIG. 7B is a perspective view seen from below;

FIG. 9A is a graph showing results under a first condition and FIG. 9B is a graph showing results under a second condition;

FIG. 14A is a graph showing results under a first condition and FIG. 14B is a graph showing results under a second condition.

DETAILED DESCRIPTION OF THE INVENTION

A reel 10 relating to an exemplary embodiment of the present invention, and a recording tape cartridge 11 that is structured so as to include the reel 10, will be described on the basis of FIG. 1 through FIG. 10. First, the schematic overall structure of the recording tape cartridge 11 including the reel 10 will be described, and then the characteristic structure of the reel 10 will be described. Note that, for convenience of explanation, the direction of loading the recording tape cartridge 11 into a drive device is denoted by arrow A, and this direction of arrow A is the front direction (front side) of the recording tape cartridge 11. Further, the direction denoted by arrow U is the upward direction (upper side) of the recording tape cartridge 11.

(Schematic Overall Structure of Recording Tape Cartridge)

Figure 5:
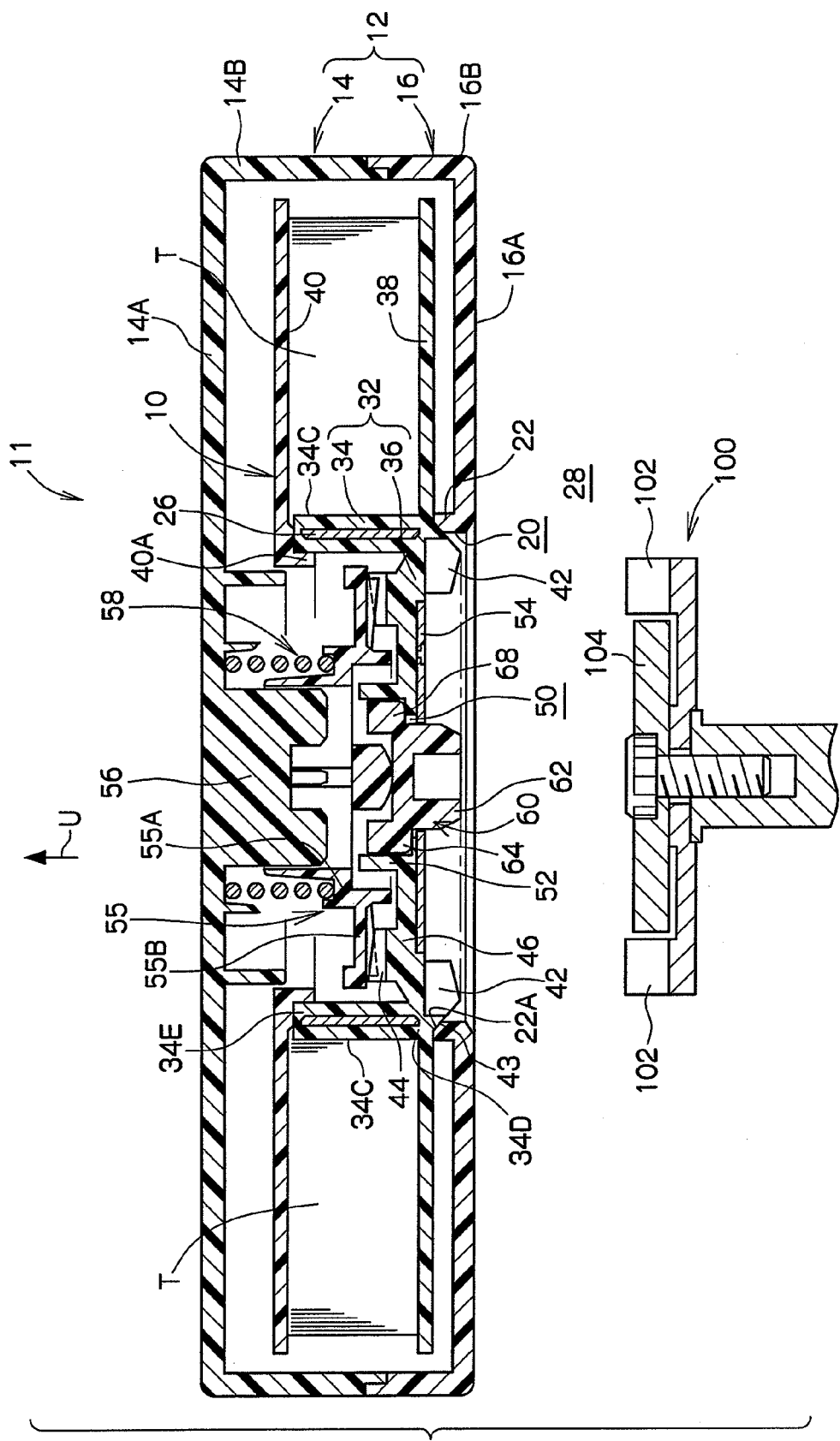
FIG. 5 is a side sectional view at a time when a recording tape cartridge relating to the exemplary embodiment of the present invention is not in use.
Figure 6:
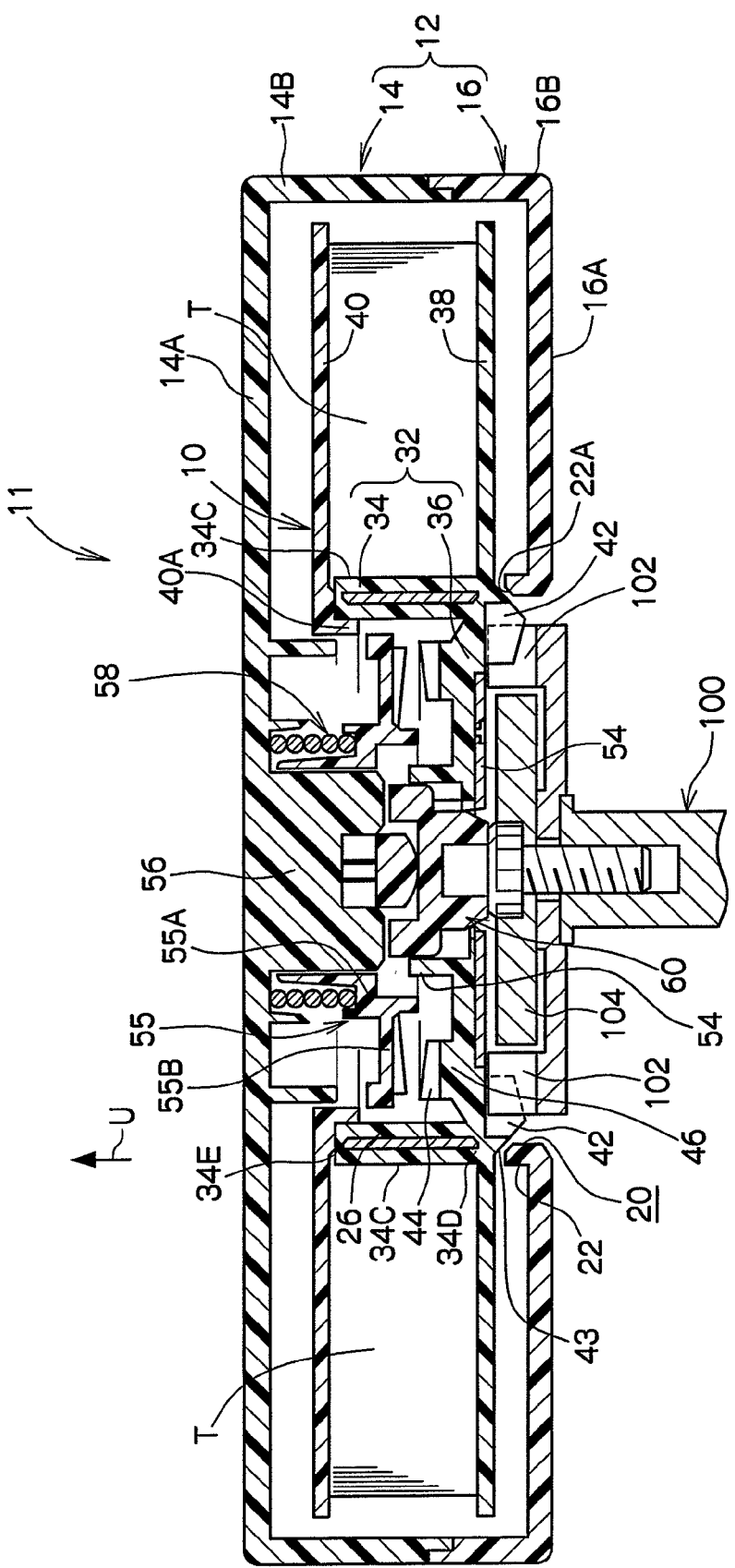
FIG. 6 is a side sectional view at a time when the recording tape cartridge relating to the exemplary embodiment of the present invention is in use.

As shown in FIG. 5 through FIG. 7, the recording tape cartridge 11 relating to the present exemplary embodiment has a case 12. The case 12 is structured by an upper case 14 and a lower case 16 being joined together. Specifically, the upper case 14 is structured such that a substantially frame-shaped peripheral wall 14B stands erect along the outer edge of a ceiling plate 14A which is substantially rectangular in plan view. The lower case 16 is structured such that a peripheral wall 16B stands erect along the outer edge of a floor plate 16A which has a configuration substantially corresponding to that of the ceiling plate 14A. The case 12 is formed substantially in the shape of a box by the upper case 14 and the lower case 16 being joined together by ultrasonic welding or screws or the like in a state in which the open end of the peripheral wall 14B and the open end of the peripheral wall 16B abut one another.

At a corner portion of the case 12 at the leading side in the direction of loading the recording tape cartridge 11 into a drive device, the ceiling plate 14A, the peripheral wall 14B, the floor plate 16A, and the peripheral wall 16B are respectively cut-out such that an opening 18, which is inclined with respect to the direction of loading, is formed. Further, a circular gear opening 20 which passes through the floor plate 16A is provided in the substantially central portion of the floor plate 16A, and is for exposing a reel gear 42 which will be described later. At the edge portion of the gear opening 20 at the floor plate 16A, an annular rib 22 projects toward the interior of the case 12, and is for positioning and dust-proofing the reel 10 which will be described later.

As shown in FIG. 5, only one of the reel 10 is rotatably accommodated within the case 12. A magnetic tape T serving as a recording tape is wound on the reel 10, and a leader block 30 serving as a leader member is attached to the distal end of the magnetic tape T. When the recording tape cartridge 11 is not in use, the leader block 30 is accommodated and held at the inner side of the opening 18 of the case 12. Further, in this state, the leader block 30 closes-off the opening 18 and impedes entry of dust and the like into the case 12.

When the magnetic tape T is pulled-out within a drive device, the leader block 30 is taken-out from the case 12 by a pull-out means of the drive device and is guided to a take-up reel (not shown) of the drive device. Note that, instead of a leader block, a leader pin shaped as a small shaft, or a tape-shaped leader tape may be employed as the leader member. In this case, for example, a door member for opening and closing the opening 18 is provided at the case 12. Further, the opening 18 may be formed along the peripheral walls 14B, 16B (by cutting out only the peripheral walls 14B, 16B).

Figure 1:
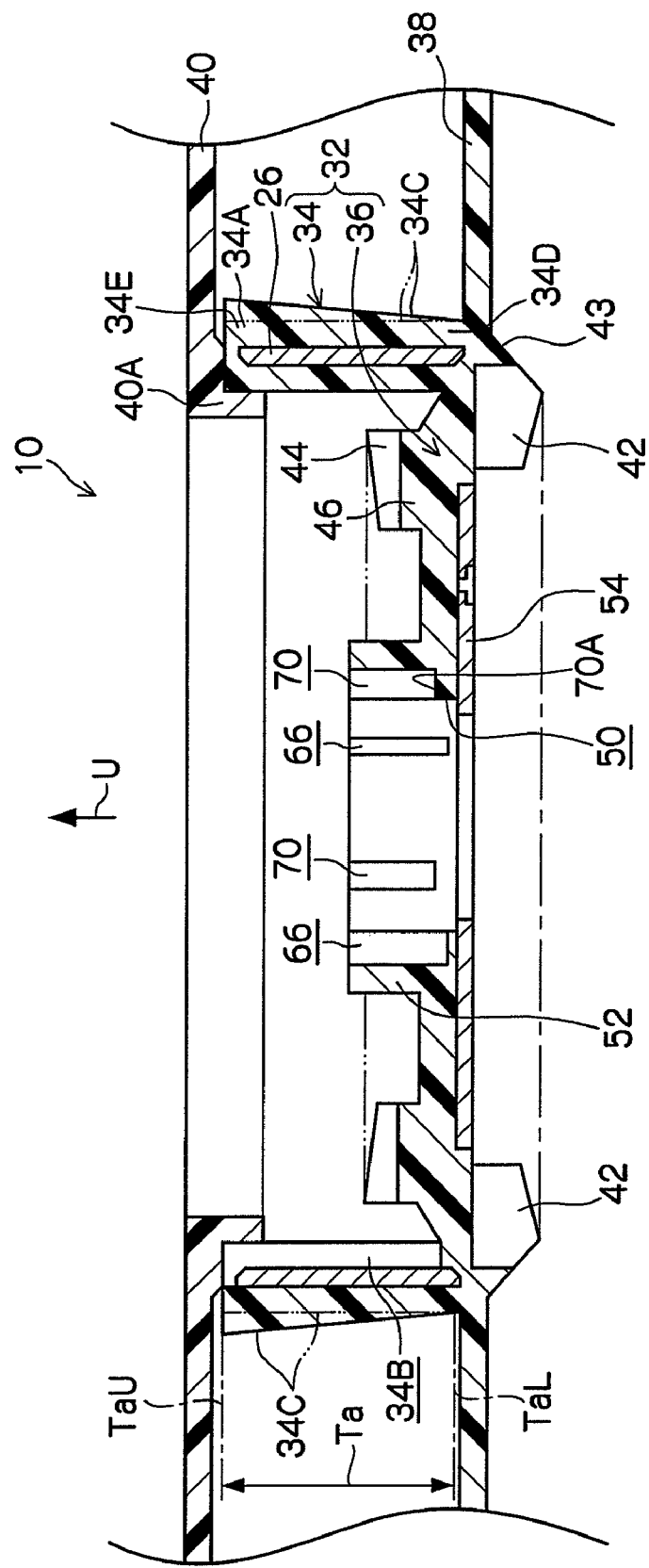
FIG. 1 is a side sectional view of a reel relating to an exemplary embodiment of the present invention, before winding of a magnetic tape.
Figure 2:
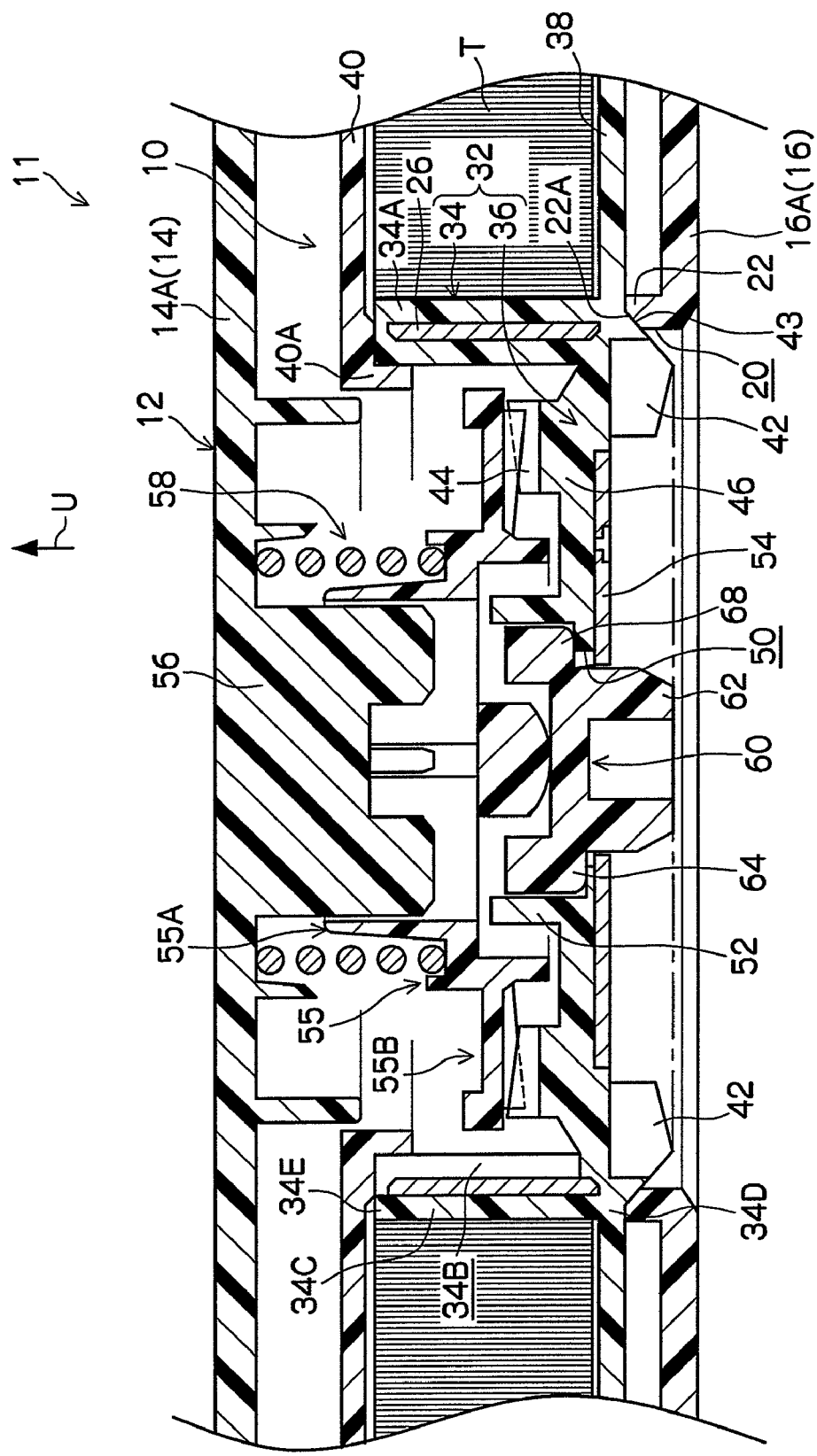
FIG. 2 is a side sectional view of a state in which the magnetic tape is wound on the reel relating to the exemplary embodiment of present invention.
Figure 3:
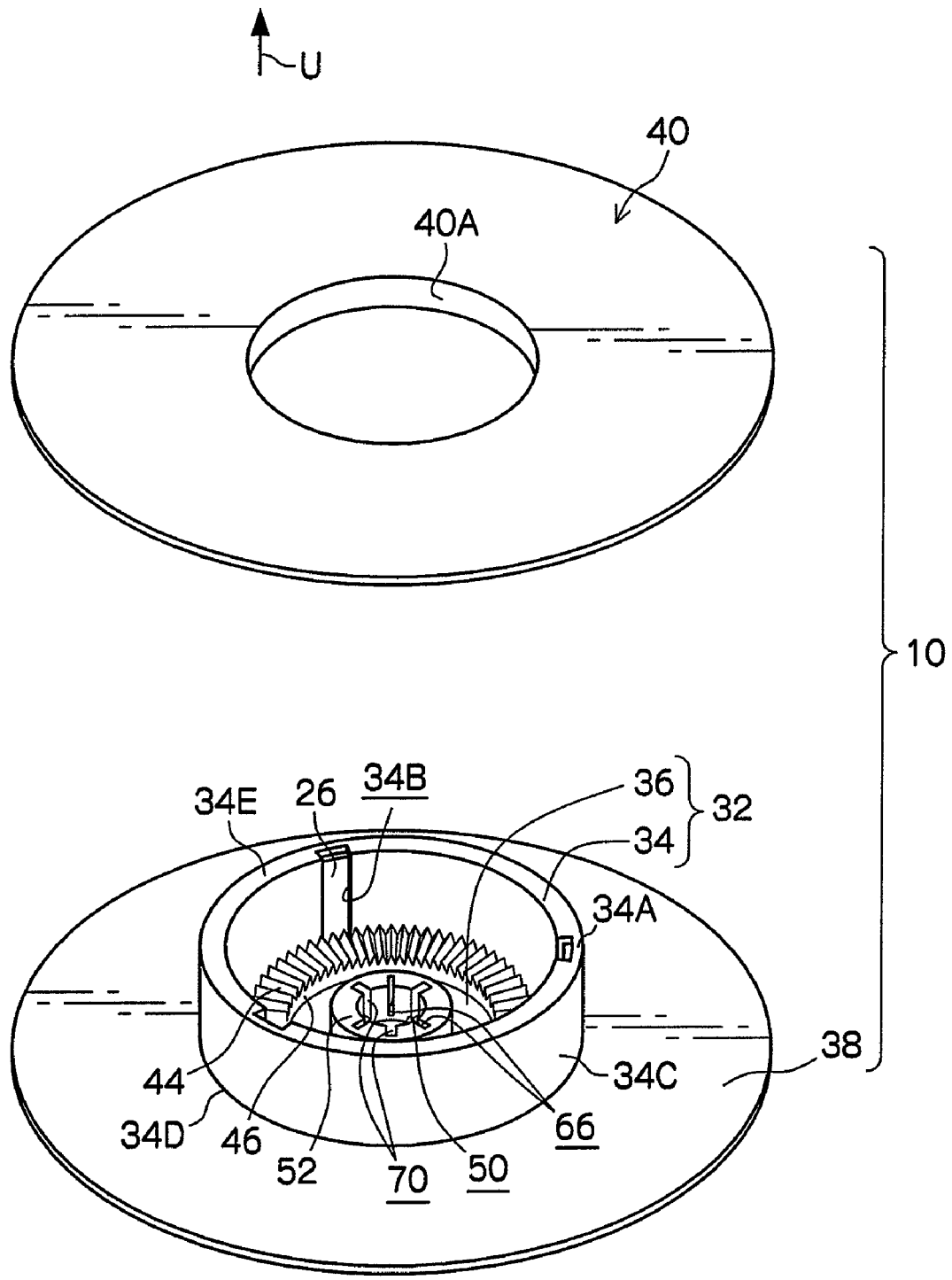
FIG. 3 is an exploded perspective view of the reel relating to the exemplary embodiment of the present invention.

As shown in FIG. 1 through FIG. 3, the reel 10 has a reel hub 32 that structures the axially central portion of the reel 10. The reel hub 32 is substantially formed in the shape of a cylindrical tube having a floor, and includes a cylindrical tube portion 34 on whose outer peripheral surface the magnetic tape T is wound, and a floor portion 36 that closes-off the bottom portion of the cylindrical tube portion 34. Further, a lower flange 38, which projects-out toward the radial direction outer side of the reel hub 32, is provided in a vicinity of the floor portion 36 side end portion (the lower end portion) of the reel hub 32. On the other hand, an upper flange 40, which projects-out toward the radial direction outer side of the reel hub 32, is provided from the upper end portion of the cylindrical tube portion 34. The magnetic tape T is wound at the outer peripheral surface of the cylindrical tube portion 34 of the reel hub 32, between the opposing surfaces of the lower flange 38 and the upper flange 40.

The annular reel gear 42, which is formed coaxially with the reel 10, projects from a vicinity of the outer periphery at the bottom surface (outer surface) of the floor portion 36 of the reel hub 32. The reel gear 42 can mesh with a driving gear 102 that is provided at the distal end of a rotating shaft 100 of a drive device. On the other hand, as shown in FIG. 1 through FIG. 3, an annular engaging gear 44 that is formed coaxially with the reel 10 is provided in a vicinity of the outer periphery at the top surface (inner surface) of the floor portion 36 of the reel hub 32. The engaging gear 44 is formed on an annular pedestal portion 46 that protrudes slightly from the inner surface of the floor portion 36. The engaging gear 44 can mesh with a braking gear portion 55B of a braking member 55 that will be described later.

A pass-through hole 50 is provided at the axially central portion of the floor portion 36 of the reel hub 32. A boss portion 52 for a clutch stands erect from the top surface of the floor portion 36 along the edge portion of the pass-through hole 50. This boss portion 52 for a clutch will be described together with a clutch member 60 that will be described later.

Although details thereof will be described later, the main portion of the reel 10 is formed by resin molding. The reel has an annular reel plate 54 that is fixed at the inner side of the reel gear 42 at the bottom surface (obverse) of the floor portion 36 of the reel hub 32. The reel plate 54 is formed in an annular shape of a magnetic material, and is fixed coaxially to the floor portion 36 of the reel hub 32. The annular reel plate 54 is fixed to the floor portion 36 of the reel hub 32 by, for example, insert molding or welding. The reel plate 54 is for attraction and holding by a magnet 104 of the rotating shaft 100 of the drive device.

The above-described reel 10 is accommodated in the case 12, and is disposed on the annular rib 22 when the reel 10 is not in use. Specifically, radial direction displacement of the reel 10 is restricted due to the outer side portion of a taper portion 43 that is continuous with the radial direction outer side of the reel gear 42 at the floor portion 36 (i.e., a vicinity of the inner edge of the lower flange 38) abutting the top end surface of the annular rib 22, and the inner edge portion of the top end of the annular rib 22 being a taper surface 22A that corresponds to the taper portion 43.

Figure 7B:
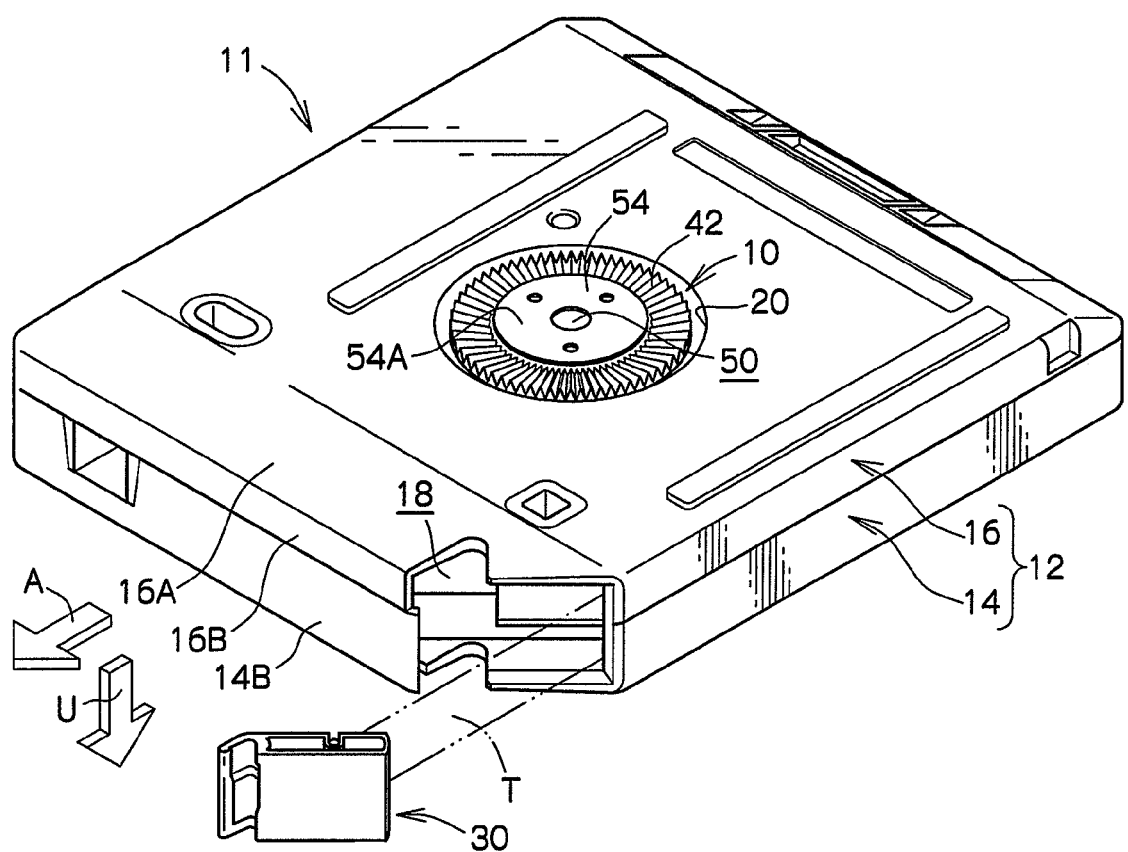

In this state, the reel 10 on the whole is positioned within the case 12, and the reel gear 42 and the reel plate 54 are exposed from the gear opening 20 (see FIG. 7B). Namely, the reel gear 42 does not project-out from the outer surface (bottom surface) of the floor plate 16A, and looks out on the exterior of the case 12 from the gear opening 20. Further, the pass-through hole 50 looks out on the gear opening 20 through a through-hole 54A that is formed in the axial center of the reel plate 54. In this way, operation of the reel 10, i.e., chucking (holding) and driving/rotating, are possible from the exterior of the case 12.

Figure 8:
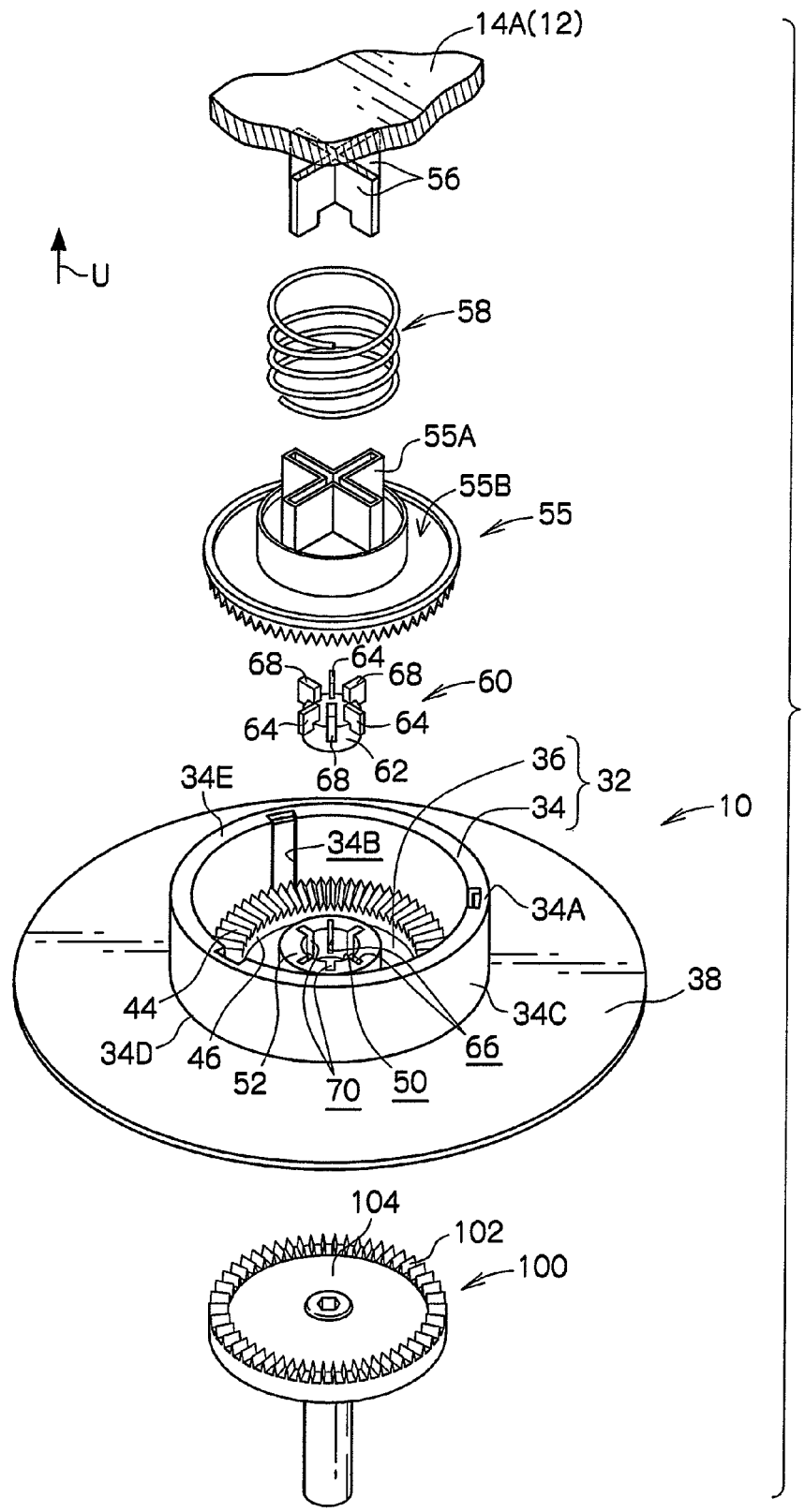
FIG. 8 is an exploded perspective view of reel locking structural portions of the recording tape cartridge relating to the exemplary embodiment of the present invention.

Further, as shown in FIG. 2, FIG. 5 and FIG. 8, the recording tape cartridge 11 has the braking member 55 which is for impeding rotation of the reel 10 at times when the recording tape cartridge 11 is not in use. The braking member 55 is structured with a rotation restricting portion 55A and the braking gear portion 55B as the main portions thereof. The rotation restricting portion 55A is inserted into a cross-shaped rib 56 that is formed to project from the ceiling plate 14A of the case 12, such that relative rotation with respect to the case 12 is restricted. The braking gear portion 55B extends outwardly in the radial direction from the lower end of the rotation restricting portion 55A, and can engage with the engaging gear 44 of the reel 10.

The braking member 55 is structured so as to, by being displaced within the case 12 in the axial direction of the reel 10 when not in use, be able to selectively assume a braking position at which the braking gear portion 55B meshes with the engaging gear 44, and a rotation permitting position at which meshing of the braking gear portion 55B and the engaging gear 44 is cancelled. A compression coil spring 58 is disposed in a compressed state between the braking member 55 and the ceiling plate 14A of the case 12. The braking member 55 is offset toward the braking position due to the urging force of the compression coil spring 58.

Further, the recording tape cartridge 11 has a clutch member 60 that is operated from the exterior at the time of canceling the locked state of the reel 10 by the braking member 55. When the driving gear 102 of the rotating shaft 100 of the drive device meshes with the reel gear 42, the clutch member 60 is pushed by the rotating shaft 100 and displaces the braking member 55 upwardly, i.e., toward the rotation permitting position.

Specifically, the clutch member 60 is disposed between the braking member 55 and the floor portion 36 of the reel 10, and has a clutch main body 62 that passes-through the floor portion 36. Further, plural guide ribs 64 and plural stopper ribs 68 extend outwardly in the radial direction from the clutch main body 62. Due to the guide ribs 64 being disposed in rotation restricting grooves 66 which are formed in the boss portion 52 for a clutch of the reel 10, the guide ribs 64 exhibit the function of restricting relative rotation of the clutch member 60 with respect to the reel 10, and the function of guiding the clutch member 60 in the axial direction of the reel 10. Due to the stopper ribs 68 abutting stopper surfaces 70A of stopper grooves 70 which are formed in the boss portion 52 for a clutch, the stopper ribs 68 exhibit the function of positioning the clutch member 60 with respect to the reel 10 in the axial direction (including a function of preventing the clutch member 60 from coming out).

As described above, the braking member 55 is structured such that, when the recording tape cartridge 11 is not in use, as shown in FIG. 5, the braking gear portion 55B meshes with the reel gear 42 due to the urging force of the compression coil spring 58, and rotation of the reel 10 with respect to the case 12 is prevented. On the other hand, as shown in FIG. 6, when the reel gear 42 of the reel 10 meshes with the driving gear 102 of the rotating shaft 100 of the drive device, rotation of the reel 10 with respect to the case 12 is permitted due to the clutch member 60, which is pushed by the rotating shaft 100, displacing the braking member 55 to the rotation permitting position.

(Detailed Structure of Reel)

As shown in FIG. 1 through FIG. 3, at the reel 10, the reel hub 32 and the lower flange 38 which are respectively formed of a resin material are formed integrally. Specifically, the reel hub 32 and the lower flange 38 are formed integrally by injection molding of a resin material. The lower flange 38 is formed in an annular shape, and extends outwardly in the radial direction of the reel hub 32 over the entire periphery of the reel hub 32. Although not illustrated, in the part in which the reel hub 32 and the lower flange 38 are formed integrally, gates for injection of the resin material are provided at three points in the vicinity of the cylindrical tube portion 34.

On the other hand, in the present exemplary embodiment, the upper flange 40 is molded independently as a member separate from the reel hub 32, and is coaxially fixed by ultrasonic welding to the upper end of the cylindrical tube portion 34 of the reel hub 32. Namely, the reel 10 is a so-called two-piece structure structured such that the part in which the reel hub 32 and the lower flange 38 are formed integrally, and the upper flange 40, are the main parts of the reel 10. An annular rib 40A, whose outer diameter substantially corresponds to the inner diameter of the cylindrical tube portion 34, projects downward at the axially central portion of the upper flange 40, and is placed in (fit together with) the cylindrical tube portion 34.

As shown in FIG. 1 and FIG. 2, the reel 10 has a reinforcing ring 26 that is inserted into the cylindrical tube portion 34 of the reel hub 32. The reinforcing ring 26 is formed in a cylindrical tube shape that substantially corresponds to the cylindrical tube portion 34 of the reel hub 32. The reinforcing ring 26 reinforces (stiffens) the cylindrical tube portion 34 of the reel hub 32 in the radial direction. Specifically, by carrying out molding in a state in which the reinforcing ring 26 is set in a mold for injection molding of the reel hub 32 and the lower flange 38, the reinforcing ring 26 is fixed to the reel hub 32 by insert molding. In the present exemplary embodiment, the reinforcing ring 26 is structured by a metal material.

Further, in the present exemplary embodiment, the reinforcing ring 26 is embedded in within a range of the thickness of the cylindrical tube portion 34 of the reel hub 32. Namely, the reel hub 32 is structured such that a resin layer is formed not only at the outer periphery thereof around which the magnetic tape T is wound, but also at the inner peripheral side thereof as well. As shown in FIG. 3, a cut-out portion 34B for causing the reinforcing ring 26 to contact the mold is formed in the inner peripheral side of the cylindrical tube portion 34 of the reel hub 32.

As shown in FIG. 1 and FIG. 2, at the reel 10, the reinforcing ring 26 is covered, at the top end side thereof as well, by the resin material that structures the cylindrical tube portion 34. The reinforcing ring 26 is structured such that a top end 26A thereof is positioned in a vicinity of a top end TaU of a winding range Ta of the magnetic tape T at the cylindrical tube portion 34 of the reel hub 32, and a bottom end 26B of the reinforcing ring 26 is positioned in a vicinity of a bottom end TaL of the winding range Ta (the top surface of the root portion of the lower flange 38). In the present exemplary embodiment, the bottom end 26B projects-out to the same level as the bottom end TaL of the winding range Ta or to slightly below the bottom end TaL of the winding range Ta. On the other hand, the top end 26A is disposed such that the upper portion of the reinforcing ring 26 overlaps the annular rib 40A of the upper flange 40 in the vertical direction.

Further, in the present exemplary embodiment, the reel hub 32 and the lower flange 38 are formed of polycarbonate. A thickness th of a radial direction outer side portion 34A of the cylindrical tube portion 34 of the reel hub 32 is set in a range of 1.0 mm to 1.5 mm. In the present exemplary embodiment, the thickness th is approximately 1.5 mm. Note that the reel hub 32 and the lower flange 38 may be formed of a resin material other than polycarbonate.

On the other hand, the reinforcing ring 26 that is formed of a metal material as described above is, in the present exemplary embodiment, formed of aluminum or an aluminum alloy, and the thickness thereof along the radial direction is approximately 1.0 mm. More specifically, the reinforcing ring 26 is structured of an aluminum material having a proof stress of 350[N/mm$^2$]. The proof stress is set such that the amount of deformation of the cylindrical tube portion 34 with respect to the tight-winding (the winding pressure) of the magnetic tape T wound around the cylindrical tube portion 34 of the reel hub 32 is less than or equal to an allowable amount (such that settling does not arise).

Namely, the reinforcing ring 26 can be interpreted as a reinforcing (stiffening) member for improving the rigidity (increasing the radial modulus) in the radial direction of the cylindrical tube portion 34 of the reel hub 32, and, provided that it achieves this function, the dimension (thickness) and material (properties) thereof are not limited. Accordingly, for example, a steel material may be used for the reinforcing ring 26, or a non-metal material such as a resin or a fiber-reinforced resin or the like may be used therefor. Note that, in the present exemplary embodiment, because aluminum materials are corrosive, the surface of the reinforcing ring 26 is subjected to a corrosion preventing treatment such as, for example, plating or the like.

As is shown in an exaggerated manner in FIG. 1, at the reel 10, in the state in which the magnetic tape T is not wound, a tape winding surface 34C, which is the outer peripheral surface of the cylindrical tube portion 34 of the reel hub 32 (the outer surface of the winding range Ta), is formed in a taper shape. On the other hand, as shown by the imaginary line in FIG. 1 and in FIG. 2, the reel 10 is structured such that, in the state in which the magnetic tape T is wound on the reel hub 32, the reel hub 32 deforms due to the winding pressure of the magnetic tape T (the tight-winding), and the difference in the outer diameters of the both axial direction end portions of the tape winding surface 34C substantially disappears. More specific description thereof is given hereinafter.

In the reel 10 relating to the present exemplary embodiment, the cylindrical tube portion 34 of the reel hub 32 is structured such that the radial direction rigidity of a top end portion 34E, which is the open end, is lower than that of a bottom end portion 34D at which the floor portion 36 is provided and from which the lower flange 38 extends. Therefore, the tape winding surface 34C in a free state is formed in a substantially tapered shape in which the diameter is greater at the top end portion 34E side than at the bottom end portion 34D side, as shown in FIG. 1.

Figure 4:
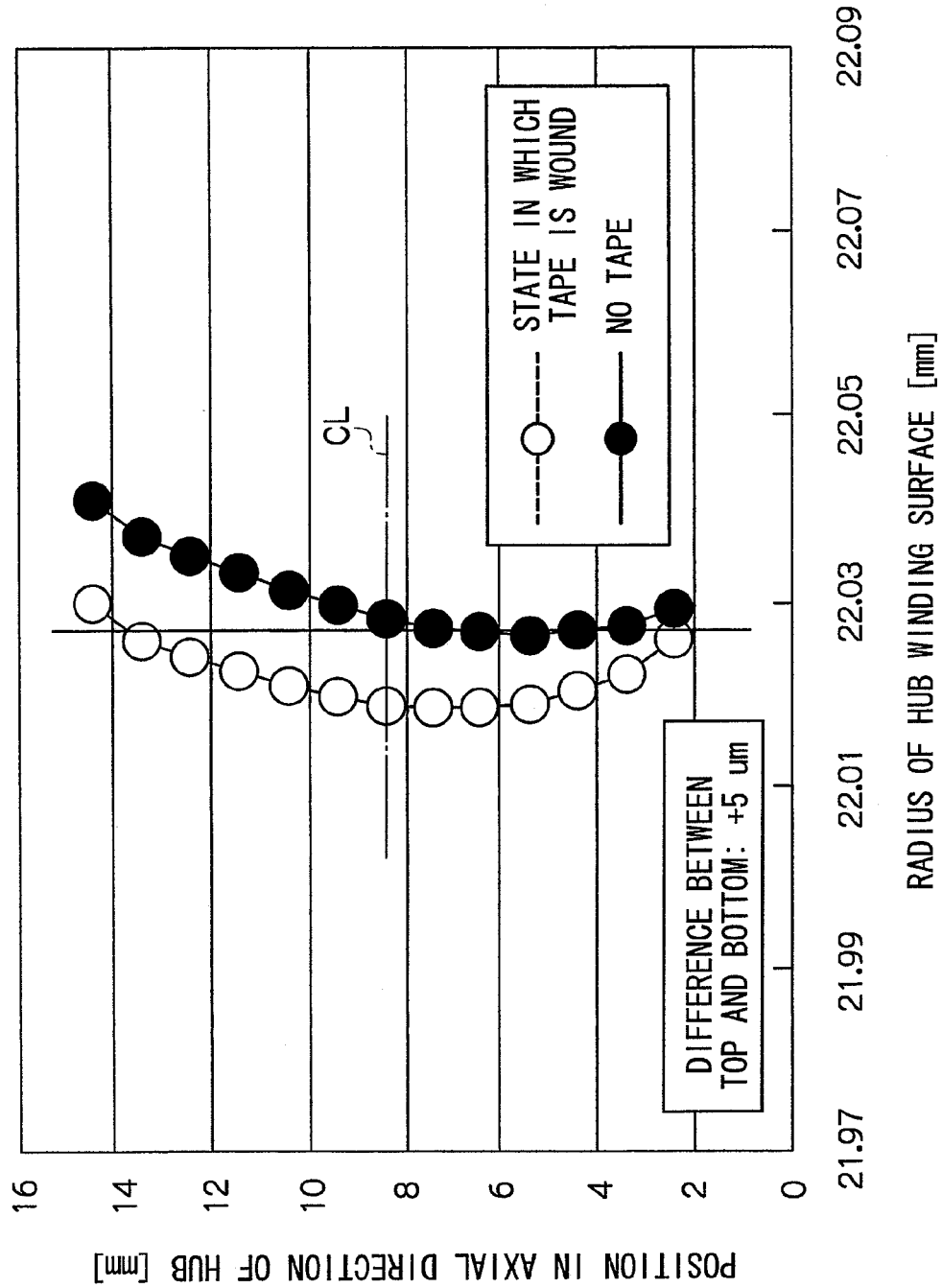
FIG. 4 is a graph showing the shape of a tape winding surface of the reel relating to the exemplary embodiment of the present invention.

The taper of the tape winding surface 34C in the free state is formed as shown in FIG. 4. FIG. 4 is a graph in which the axial direction position of the tape winding surface 34C is on the vertical axis, and the outer radius of the tape winding surface 34C is on the horizontal axis. The black plotted points show the outer radius actually measured by a three-dimensional measuring device at each position of approximately 1 mm in the axial direction of the tape winding surface 34C in the free state. To supplementarily explain the above, the width of the magnetic tape T wound on the tape winding surface 34C is 12.65 mm, and the interval between the upper and lower flanges 40, 38 at the tape winding surface 34C is 12.88 mm.

The tapered shape of the tape winding surface 34C shown by the line of the black plotted dots in FIG. 4 is set such that, in a case in which the magnetic tape T is wound on the tape winding surface 34C under predetermined winding conditions and the cylindrical tube portion 34 deforms, the tape winding surface 34C becomes a shape such as shown by the white plotted dots in FIG. 4 (values actually measured by a three-dimensional measuring device, in the same way as are measured in the free state). Namely, at the reel 10, the shape of the tape winding surface 34C in the free state is determined such that, in the state in which the magnetic tape T is wound on the tape winding surface 34C under predetermined winding conditions, the tape winding surface 34C forms a shape which, at least at the winding range Ta, is substantially symmetrical with respect to the central portion in the transverse direction of the magnetic tape T (the axial direction of the tape winding surface 34C) (refer to central line CL that substantially bisects the tape winding surface 34C in the axial direction). (Hereinafter, this will simply be called "substantially symmetrical in the transverse direction".) In other words, the shape of the tape winding surface 34C in the free state is determined such that the difference in the outer diameters at the bottom end portion 34D and the top end portion 34E (the positional offset in the radial direction) becomes less than or equal to an allowable value (which will be described hereinafter).

As can be understood from FIG. 4, in the present exemplary embodiment, in the state in which the magnetic tape T is wound on the tape winding surface 34C under predetermined winding conditions, the difference in the outer diameters at the bottom end portion 34D and the top end portion 34E of the cylindrical tube portion 34 is approximately 5 μm (within an allowable range that will be described later), and further, between the bottom end portion 34D and the top end portion 34E, the outer radius of the tape winding surface 34C is slightly smaller than at the bottom end portion 34D and the top end portion 34E.

The predetermined winding conditions of the magnetic tape T with respect to the cylindrical tube portion 34 of the reel hub 32 in the present exemplary embodiment will be supplementarily explained hereinafter. The magnetic tape T that is wound on the cylindrical tube portion 34 (outer diameter: 44 mm) of the reel hub 32 has a width of 12.65 mm (½ inch), a thickness of 6.6 μm, and a length of 820 m. The magnetic tape T is wound around the cylindrical tube portion 34 of the reel hub 32 while tensile force (tension) of 70 g per cross-section (the above width×thickness) is applied.

Operation of the present exemplary embodiment will be described next.

At the recording tape cartridge 11 having the above-described structure, as shown in FIG. 5, when the recording tape cartridge 11 is not in use, the braking member 55 is positioned at the rotation locking position and the braking gear portion 55B is meshed with the engaging gear 44, due to the urging force of the compression coil spring 58. Therefore, rotation of the reel 10 with respect to the case 12 is impeded. At this time, the reel gear 42 of the reel 10 is exposed from the gear opening 20, and the clutch main body 62 of the clutch member 60 is inserted through the pass-through hole 50 and looks out on the gear opening 20.

On the other hand, when the magnetic tape T is to be used, the recording tape cartridge 11 is loaded into the bucket (not shown) of a drive device along the direction of arrow A. Then, when the recording tape cartridge 11 is loaded to a predetermined depth in the bucket, the bucket is lowered, and the rotating shaft 100 of the drive device relatively approaches the gear opening 20 of the case 12 (moves upward) and holds the reel 10. Specifically, the rotating shaft 100 causes the driving gear 102 thereof to mesh with the reel gear 42, while attracting and holding the reel plate 54 by the magnet 104 in a non-contact state.

Accompanying the meshing-together of the reel gear 42 and the driving gear 102, i.e., the relative movement of the rotating shaft 100 with respect to the case 12 in the direction of approaching the case 12 along the axial direction, the axially central portion of the rotating shaft 100 abuts the clutch main body 62 of the clutch member 60, and pushes the clutch member 60 upward against the urging force of the compression coil spring 58. In this way, the braking member 55, which is abutting the clutch member 60, also moves upward, and the meshing-together of the braking gear portion 55B of the braking member 55 and the engaging gear 44 is cancelled.

Namely, the braking member 55 reaches the rotation permitting position relative to the reel 10. When the rotating shaft 100 moves further upward, the reel 10 is brought upward together with the clutch member 60 and the braking member 55 (with their relative positions remaining unchanged) against the urging force of the compression coil spring 58. At the recording tape cartridge 11, the braking member 55 thereby reaches the relative rotation permitting position (with respect to the case 12), and the lower flange 38 separates from the annular rib 22. In this way, as shown in FIG. 6, the reel 10 rises-up within the case 12, and becomes able to rotate in a state of not contacting the inner surfaces of the case 12. Further, although detailed description thereof is omitted, due to the bucket, i.e., the recording tape cartridge 11, being lowered within the drive device, the recording tape cartridge 11 is positioned in the horizontal direction and in the vertical direction with respect to the drive device.

Thus, while a pull-out pin (not shown) of the pull-out means of the drive device engages with the leader block 30, the pull-out means takes the leader block 30 out from the case 12 and guides the leader block 30 to the take-up reel of the drive device. Then, the leader block 30 is fit into the take-up reel and forms a portion of the take-up surface around which the magnetic tape T is taken-up. In this state, when the leader block 30 rotates integrally with the take-up reel, the magnetic tape T is pulled-out from the case 12 through the opening 18, while being taken-up onto the reel hub of the take-up reel.

At this time, the reel 10 of the recording tape cartridge 11 rotates synchronously with the take-up reel due to the rotational force of the rotating shaft 100 which is transmitted by the driving gear 102 which is meshed-together with the reel gear 42. Then, recording of information onto the magnetic tape T, or playback of information recorded on the magnetic tape T, is carried out by a recording/playback head that is disposed along a predetermined tape path of the drive device.

At this time, the braking member 55 which cannot rotate with respect to the case 12 slidingly-contacts the clutch member 60 which rotates together with the reel 10 with respect to the case 12.

On the other hand, when the magnetic tape T is rewound onto the reel 10 and the leader block 30 is held in a vicinity of the opening 18 of the case 12, the bucket in which the recording tape cartridge 11 is loaded rises. Thus, the meshing-together of the reel gear 42 and the driving gear 102 is cancelled, the abutment of the rotating shaft 100 and the clutch member 60 is cancelled, and the clutch member 60 moves downward together with the braking member 55 (with the state of abutment thereof maintained) due to the urging force of the compression coil spring 58.

In this way, the respective stopper ribs 68 of the clutch member 60 abut the stopper surfaces 70A, and the braking gear portion 55B of the braking member 55 meshes with the engaging gear 44. Namely, the braking member 55 returns to the rotation locking position at which it impedes rotation of the reel 10 with respect to the case 12. Further, accompanying the operation of the braking member 55 and the clutch member 60 moving due to the urging force of the compression coil spring 58, the reel 10 also moves downward. While the lower flange 38 of the reel 10 is made to abut the annular rib 22, the reel gear 42 is returned to its initial state of being exposed from the gear opening 20. In this state, the recording tape cartridge 11 is ejected from the bucket.

The magnetic tape T is wound around the cylindrical tube portion 34 of the reel hub 32 of the reel 10 of the above-described recording tape cartridge 11. Therefore, the winding pressure (tight-winding force) of the magnetic tape T is applied inwardly in the radial direction. At the reel 10, sufficient rigidity with respect to the winding pressure of the magnetic tape T is ensured due to the reinforcing ring 26 being inserted in the cylindrical tube portion 34 of the reel hub 32. Namely, at the reel hub 32 whose top end is open, the collapsing deformation inward in the radial direction of the cylindrical tube portion 34 due to the winding pressure of the magnetic tape T (inward collapsing) is suppressed to less than or equal to an allowable amount.

Here, at the reel 10, in the state in which the magnetic tape T is wound, the tape winding surface 34C of the cylindrical tube portion 34 of the reel hub 32 forms a shape which is substantially symmetrical with respect to the transverse direction of the magnetic tape T (the axial direction of the reel hub 32). Therefore, it is difficult for curving in the transverse direction to arise at the magnetic tape T which is wound around the reel hub 32 (the curvature can be kept small). Thus, the magnetic tape T travels stably at times of recording or playing-back information onto and from the magnetic tape T.

In particular, because the metal reinforcing ring 26 is inserted (mounted) at the cylindrical tube portion 34 of the resin reel hub 32 of the reel 10, creeping deformation of the cylindrical tube portion 34 of the reel hub 32, i.e., the tape winding surface 34C, is suppressed. Even after storage for a long period of time in an environment (under conditions) in which it is easy for creeping to arise, the occurrence of transverse direction curving of the magnetic tape T is suppressed. This point will be described hereinafter on the basis of experimental and analytical results.

Figure 14A:
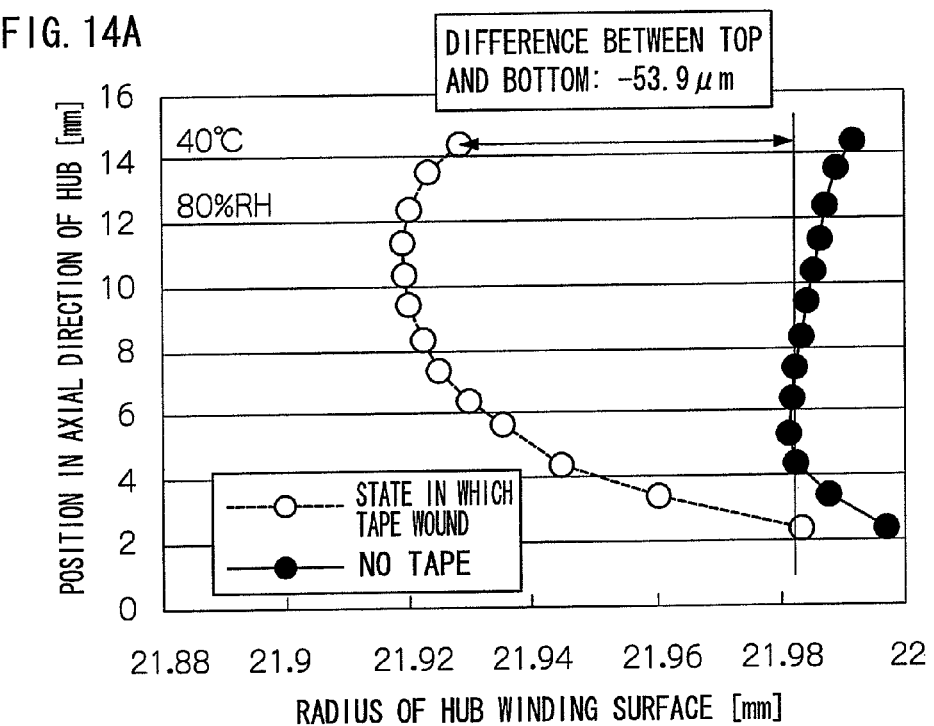
FIGS. 14A and 14B are drawings showing results of analysis of creeping of a reel relating to a comparative example that is compared with the exemplary embodiment of the present invention, where
Figure 14B:
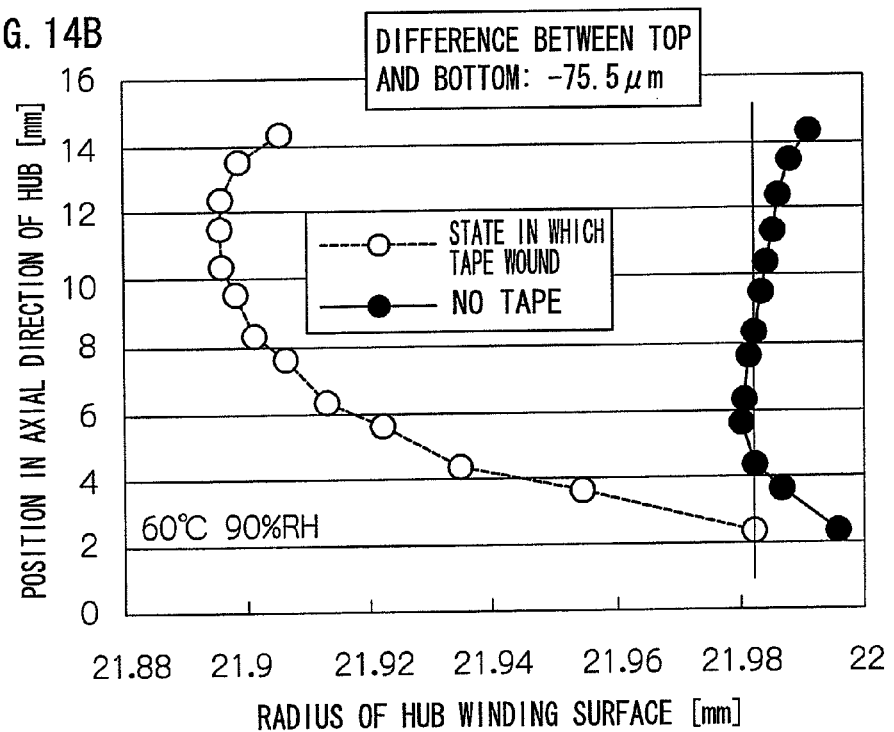

In FIG. 14A, the shape, in the free state, of the tape winding surface of a reel hub at a reel relating to a comparative example that does not have the reinforcing ring 26, is shown by the black plotted dots. The shape of the tape winding surface after storage for one week in an environment of an ambient temperature of 40° C. and relative humidity of 80% in a state in which the magnetic tape T is wound under the above-described predetermined conditions, is shown by the white plotted dots. Although not illustrated, the shape of the tape winding surface immediately after winding of the magnetic tape T under the above-described predetermined conditions is a substantially intermediate shape between the black plotted dots and the white plotted dots. From FIG. 14A, it can be understood that, in the reel relating to the comparative example, great creeping deformation (in terms of the radius, a maximum exceeding 50 μm) arises in a relatively high-temperature, high-humidity storage environment. Further, the shape of the tape winding surface at the structure relating to the above-described comparative example after storage for one week in an environment of an ambient temperature of 60° C. and relative humidity of 90% in a state in which the magnetic tape T is wound under the above-described predetermined conditions, is shown by the white plotted dots in FIG. 14B. It can be understood that even greater creeping deformation (in terms of the radius, a maximum exceeding 75 μm) arises in a storage environment of even higher temperature and humidity. Note that, because the three-dimensional measuring device cannot be used in a high-temperature environment, the white plotted dots in FIGS. 14A and 14B are results of numerical analysis and not actually measured values. However, this numerical analysis derives the creeping deformation amount on the basis of the aforementioned values that are actually measured immediately after winding of the magnetic tape T onto the cylindrical tube portion (i.e., by correction using these actually measured values), and are confirmed to be highly reliable. The same holds for the white plotted dots in FIGS. 9A and 9B which will be described later.

Figure 9A:
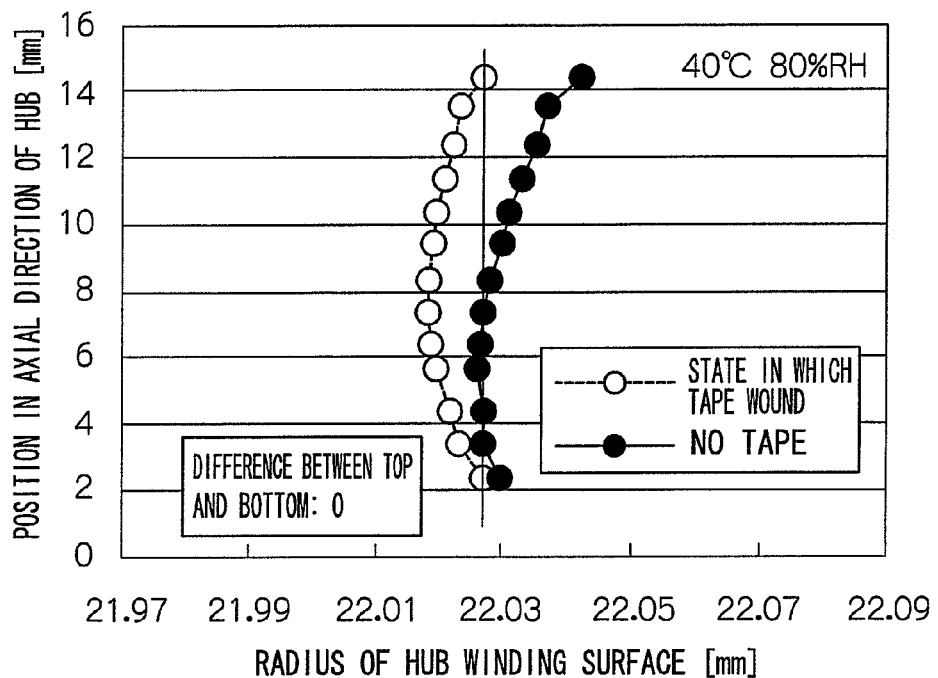
FIGS. 9A and 9B are drawings showing results of analysis of creeping of the reel relating to the exemplary embodiment of the present invention, where
Figure 9B:
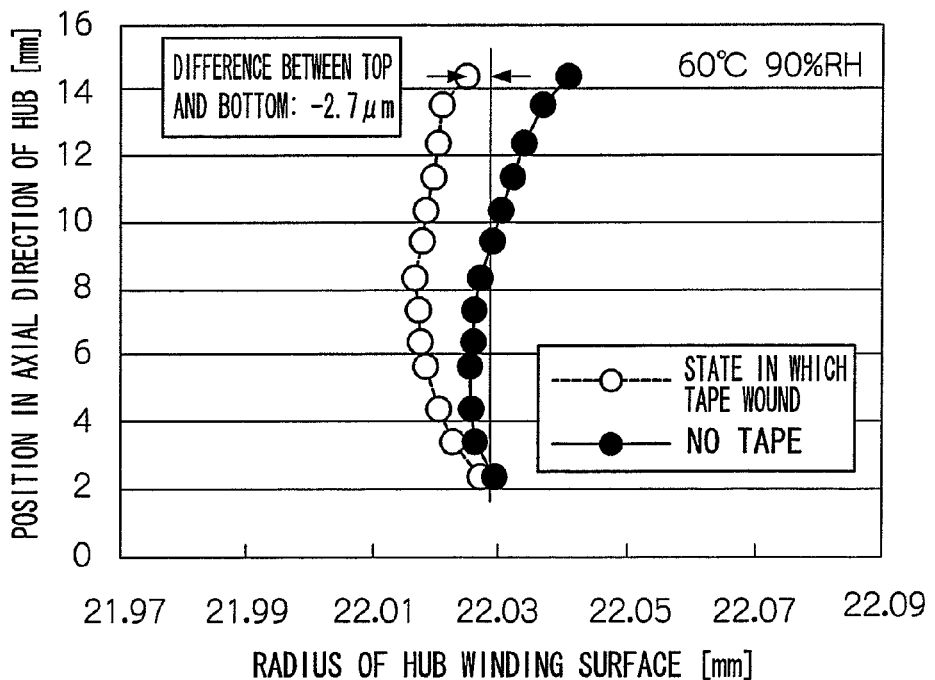

On the other hand, the shape of the tape winding surface 34C of the reel 10 after storage for one week in an environment of an ambient temperature of 40° C. and relative humidity of 80% in a state in which the magnetic tape T is wound under the above-described predetermined conditions, is shown by the white plotted dots in FIG. 9A. The shape of the tape winding surface 34C at the reel 10 after storage for one week in an environment of an ambient temperature of 60° C. and relative humidity of 90% in a state in which the magnetic tape T is wound under the above-described predetermined conditions, is shown by the white plotted dots in FIG. 9B. It is confirmed from FIG. 9A that, at the reel 10, hardly any deformation arises at the tape winding surface 34C in the environment of an ambient temperature of 40° C. and relative humidity of 80%. Further, it is confirmed that, at the reel 10, only slight deformation arises at the tape winding surface 34C even after storage for one week in the harsh environment of an ambient temperature of 60° C. and a relative humidity of 90%. To supplementarily explain the deformation of the tape winding surface 34C, at the reel 10 having the reinforcing ring 26, it is thought that the deformation of the tape winding surface 34C is mainly elastic deformation due to the increase in the winding pressure of the magnetic tape T in a high-temperature environment, and the effects of creeping are extremely small.

Figure 10A:
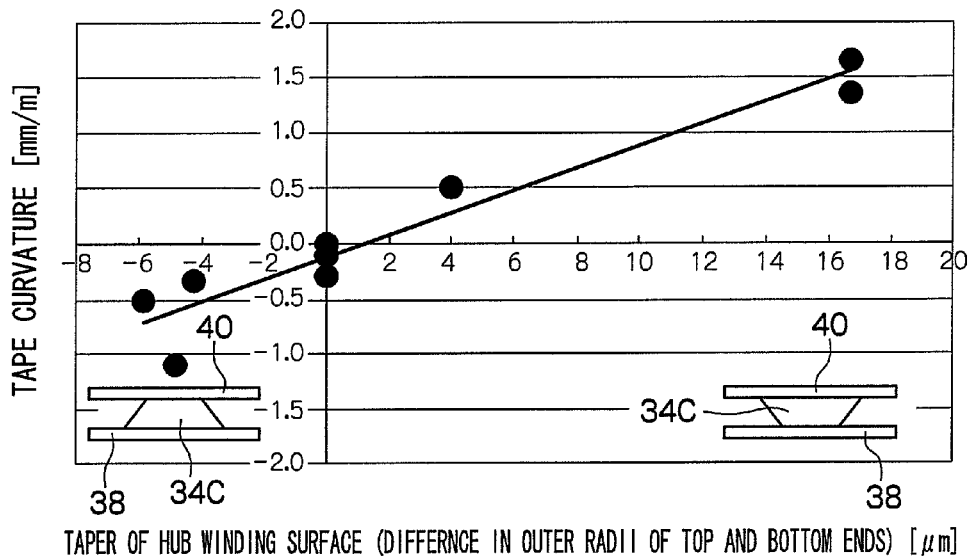
FIG. 10A is a graph showing the relationship between curvature and a difference in outer radii of top and bottom ends of a hub winding surface.
Figure 10B:
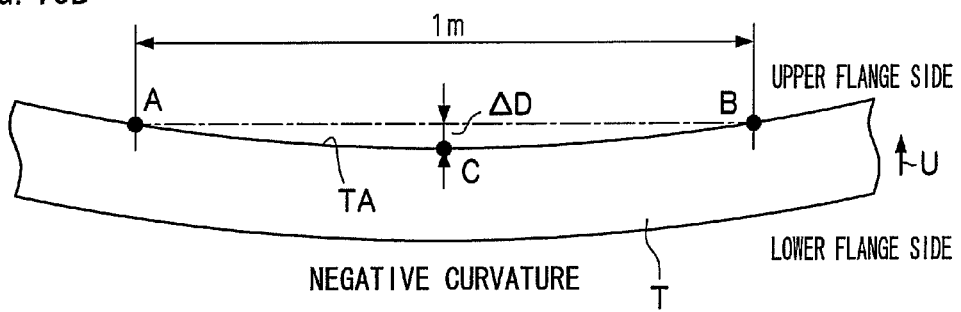
FIG. 10B is a schematic drawing for explaining negative curvature.
Figure 10C:
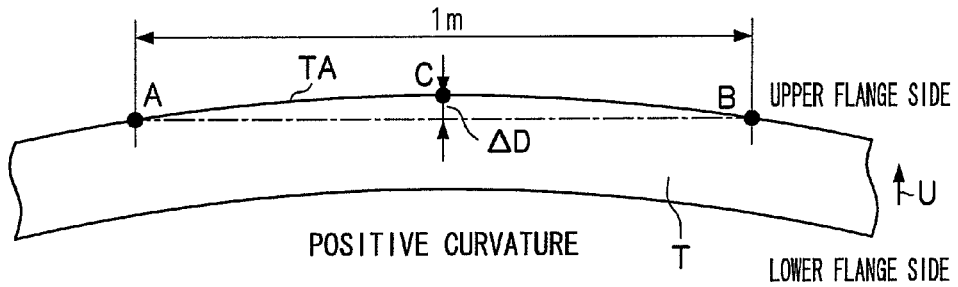
FIG. 10C is a schematic drawing for explaining positive curvature.

The tapered shape of the tape winding surface 34C in the state in which the magnetic tape T is wound in an environment of an ambient temperature of 40° C. and relative humidity of 80% (i.e., the difference in the radii of the bottom end portion 34D and the top end portion 34E of the cylindrical tube portion 34, i.e., the tape winding surface 34C), and the curvature of the magnetic tape T, (i.e., the relationship between the amount of curving in the transverse direction per unit length) is shown in a graph in FIG. 10A. In FIG. 10A, actually measured values of the curvature in a vicinity of 80 m from the proximal end at the reel hub 32 side of the magnetic tape T are plotted. To supplementarily explain curvature, as shown in FIG. 10B and FIG. 10C, curvature is measured as the deviation ΔD in the transverse direction of the tape, between a straight line AB, that connects points A, B on an edge TA of the magnetic tape T which are separated by a reference distance, and a point C, which is on the edge TA and is positioned at the center of the points A, B (is respectively separated from the points A, B by half of the reference distance). The reference distance is prescribed to be 1.0 m by JJS X6175. Further, curving that is convex at the upper flange 40 side as shown in FIG. 10C is positive curving (curvature), and curving that is convex at the lower flange side 38 as shown in FIG. 10B is negative curving (curvature), and these correspond to the positive and negative in FIG. 10A. From FIG. 10A, it can be understood that the curvature of the magnetic tape T becomes greater in proportion to the magnitude of the difference in radii of the bottom end portion 34D and the top end portion 34E of the tape winding surface 34C.

Further, it can be understood that, in the reel relating to the above-described comparative example, when creeping deformation arises due to storage under an environment conductive to creeping (high temperature and high humidity), excessive curvature that exceeds the illustrated range in FIG. 10A arises. In the comparative example (conditions) of FIG. 14A, the curvature in a vicinity of 80 m from the proximal end at the reel hub 32 side is approximately −2.5 mm/m, and in the comparative example (conditions) of FIG. 14B, the curvature in a vicinity of 80 m from the proximal end at the reel hub 32 side is approximately −10 mm/m. Note that, at a reel that does not have the reinforcing ring 26, in the state in which the magnetic tape T is wound, the upper flange side of the cylindrical tube portion deforms in a direction of collapsing inwardly (refer to the drawing at the bottom left in FIG. 10A), and therefore, negative curvature arises.

In contrast, at the reel 10, the curvature is approximately 0 under the conditions of FIG. 9A. The curvature that arises even after storage under the conditions of FIG. 9B (the above-described harsh storage environment) is about 0.2 mm/m, which is substantially not problematic in the traveling of the magnetic tape T. Note that, at the magnetic tape T under the above-described winding conditions, the allowable range of the curvature is approximately ±0.5 mm/m. Accordingly, in accordance with FIG. 10A, it can be understood that, in a case in which an environment of an ambient temperature of 40° C. and a relative humidity of 80% is the set conditions, it suffices for the difference in the radii of the bottom end portion 34D and the top end portion 34E of the tape winding surface 34C in the state in which the magnetic tape T is wound thereon (the stored state) to be from −4 μm to 6 μm. In other words, "symmetrical" and "coincide" in the present invention allow offset of about at least from −4 μm to 6 μm.

To supplementarily explain the relationship between curvature and the storage environment of the magnetic tape T, it is known that curvature is relatively small at ordinary temperature (the slope of the line is smaller than that shown in FIG. 10A), whereas the higher the storage ambient temperature and humidity of the magnetic tape T, the greater the curvature becomes. On the other hand, it is known that, due to the winding pressure of the magnetic tape T in a high-temperature, high-humidity environment as described above, the tape winding surface 34C deforms in the direction in which the diameter of the top end portion 34E, which is the low rigidity side, decreases. Accordingly, at the reel 10, the difference in the outer diameters of the bottom end portion 34D and the top end portion 34E at ordinary temperature (immediately after winding) is set to be slightly (within an allowable range) greater at the top end portion 34E which is the low rigidity side. In this way, at the reel 10, in an environment in which it is easy for the curvature to become large, the tape winding surface 34C deforms to a shape which is nearer to symmetrical with respect to the transverse direction, and therefore, the curvature can be kept small as a result. For example, in a case in which the allowable range of the difference in the radii of the bottom end portion 34D and the top end portion 34E in an environment of an ambient temperature of 40° C. and a relative humidity of 80% is made to be from −4 μm to 6 μm as described above, in consideration of the radius of the top end portion 34E decreasing approximately 5 μm in this environment as compared with ordinary temperature, the allowable range of the difference in the radii of the bottom end portion 34D and the top end portion 34E at ordinary temperature is made to be a range of approximately 1 μm to 11 μm.

In this way, at the reel 10 and the recording tape cartridge 11 relating to the exemplary embodiment of the present invention, the tape winding surface 34C forms the proper shape, in the state in which the magnetic tape T is wound on the reel 10. Further, regardless of the storage environment, the reinforcing ring 26 which is made of metal suppresses deformation of the cylindrical tube portion 34 of the reel hub 32 which is formed of resin. Therefore, deformation of the tape winding surface 34C that accompanies storage over a long period of time is markedly suppressed. Namely, at the reel 10 and the recording tape cartridge 11, excessive curvature is prevented from arising at the magnetic tape T due to storage over a long period of time, and, even after storage for a long time period, the magnetic tape T can be made to travel stably, and reading and writing of information can be carried out correctly.

The tape winding surface 34C before the magnetic tape T is wound thereon forms a substantial taper shape in which the low rigidity side is the large diameter side. Therefore, due to the magnetic tape T being wound, the tape winding surface 34C is made to be substantially symmetrical in the tape transverse direction (the radial direction positions of the portions contacting the both transverse direction ends of the magnetic tape T are made to substantially coincide), and the tape winding surface 34C is formed at which the difference in the outer diameters at the respective portions in the axial direction of the reel hub 32 is small (there is no portion where the outer diameter changes suddenly).

At the reel 10, in the state in which the magnetic tape T is wound, the tape winding surface 34C forms a shape which is substantially symmetrical in the transverse direction of the magnetic tape T. Therefore, forces that are symmetrical in the transverse direction are applied to the magnetic tape T that is wound. Thus, moderate surface pressure is applied to the magnetic tape T in the transverse direction, and the occurrence of slack in winding due to changes in the environment are suppressed.

Note that the above exemplary embodiment illustrates an example in which the present invention is applied to the reel 10 in which the reinforcing ring 26 is embedded in the cylindrical tube portion 34 of the reel hub 32, and the lower flange 38 is formed integrally with the reel hub 32. However, the present invention is not limited to the same. For example, the present invention may be applied to the reels 75, 80, 90 relating to modified examples as shown in FIG. 11 through FIG. 13.

Figure 11:
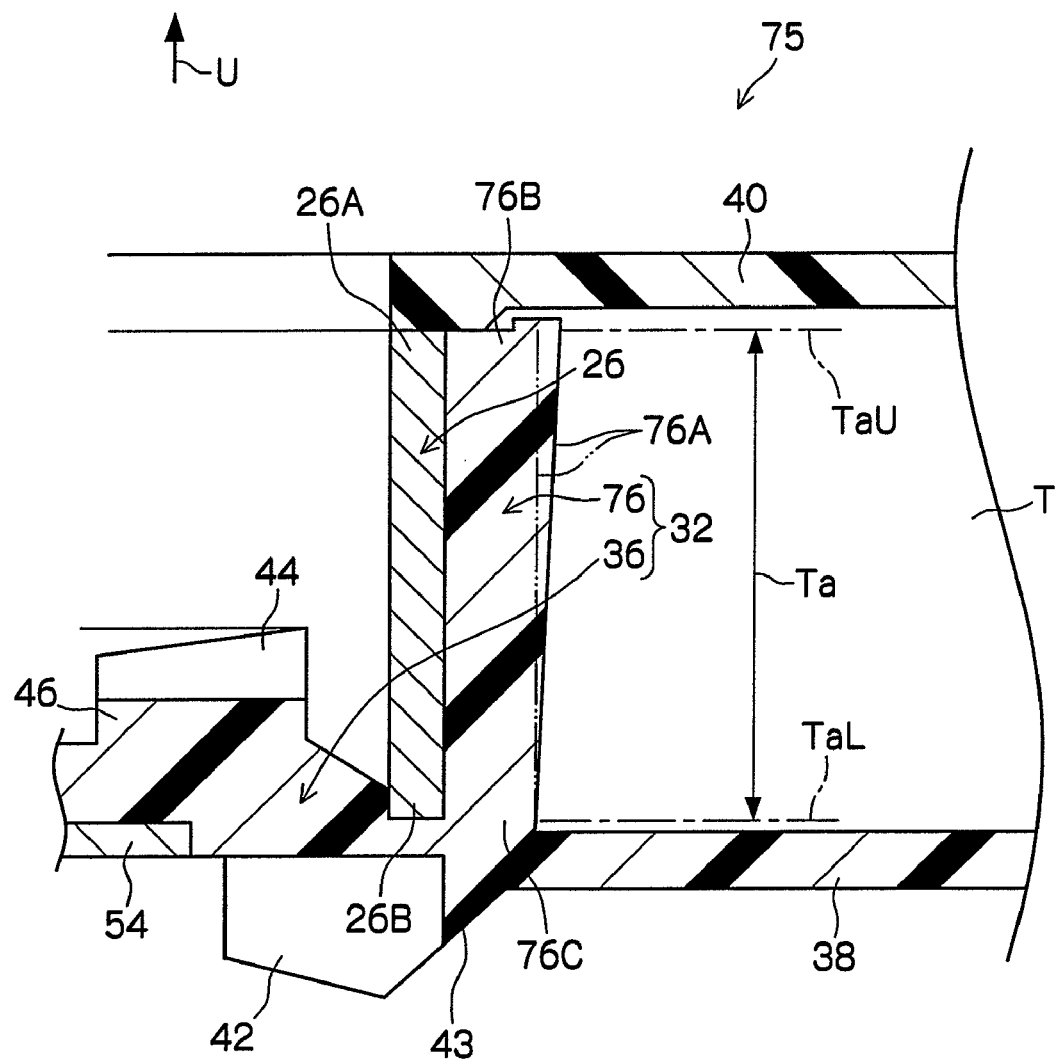
FIG. 11 is a side sectional view before winding, in which a portion of a reel relating to a first modified example of the exemplary embodiment of the present invention is enlarged.

The reel 75, which relates to a first modified example and is shown in FIG. 11, differs from the reel 10 with respect to the point that the reinforcing ring 26 is provided at the inner peripheral side of a cylindrical tube portion 76 of the reel hub 32, and the inner peripheral surface is exposed over the entire periphery. A tape winding surface 76A, which is the outer peripheral surface of the cylindrical tube portion 76 of the reel hub 32, forms a substantial taper shape in which the diameter at a top end portion 76B, which is the side of low rigidity in the radial direction, is larger than at a bottom end portion 76C which is the high rigidity side, in the same way as the tape winding surface 34C. As shown by the imaginary line in FIG. 11, at the reel 75 as well, the tape winding surface 76A is a structure that, in the state in which the magnetic tape T is wound on the cylindrical tube portion 76 of the reel hub 32, is substantially symmetrical with respect to the transverse direction of the magnetic tape T.

Figure 12:
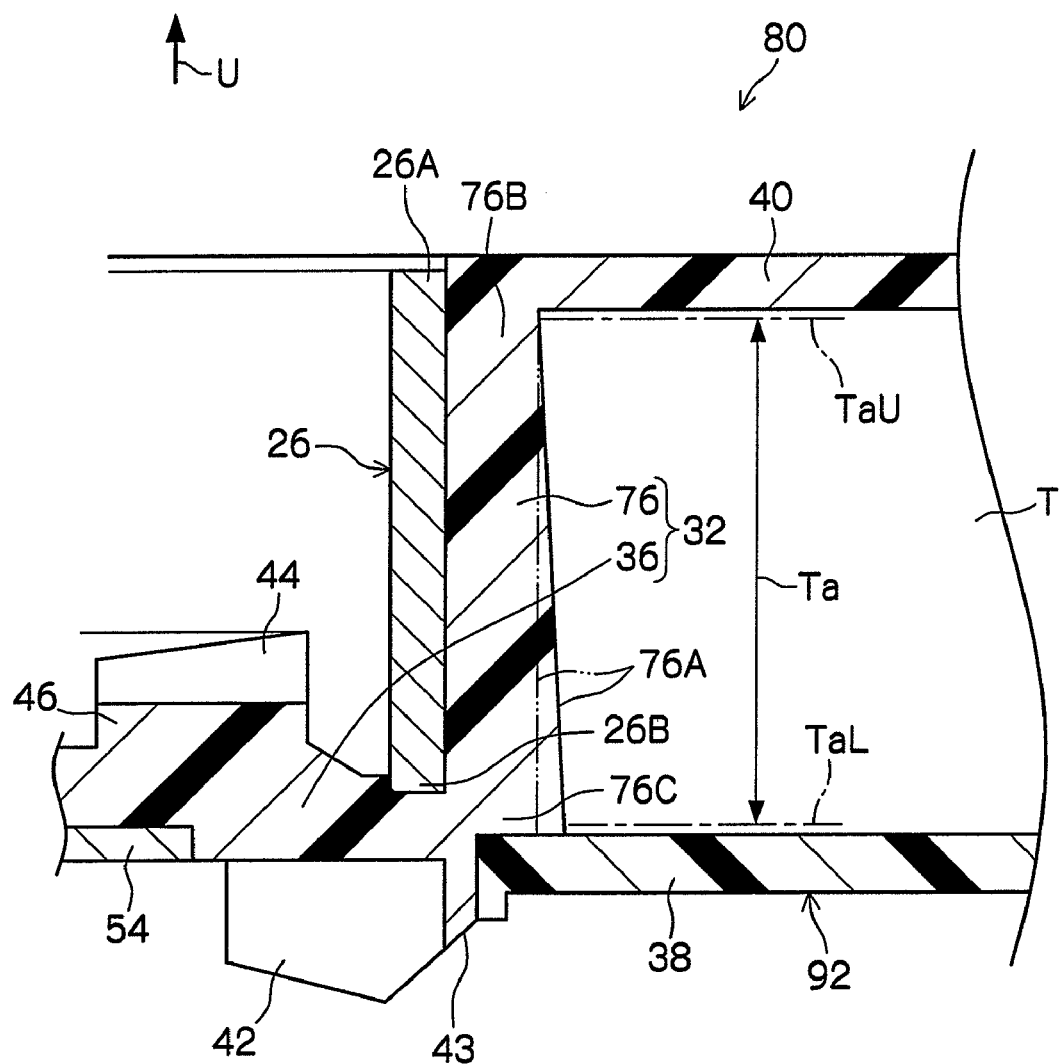
FIG. 12 is a side sectional view before winding, in which a portion of a reel relating to a second modified example of the exemplary embodiment of the present invention is enlarged.

The reel 80, which relates to a second modified example and is shown in FIG. 12, differs from the reel 10 with regard to the point that the upper flange 40 is formed integrally with the cylindrical tube portion 76 of the reel hub 32. In this reel 80, the lower flange 38 is structured as a member separate from the reel hub 32, and is fixed to the reel hub 32. Accordingly, in the second modified example, at the cylindrical tube portion 76 of the reel hub 32, the top end portion 76B has higher rigidity in the radial direction than the bottom end portion 76C. Therefore, as shown schematically in FIG. 12, the tape winding surface 76A of the reel 80 is formed in a substantial taper shape in which the bottom end portion 76C has a larger diameter than the top end portion 76B, before winding of the magnetic tape T on the reel hub 32. Further, as shown by the imaginary line in FIG. 12, the tape winding surface 76A of the reel 80 is a structure that, in the state in which the magnetic tape T is wound, is substantially symmetrical with respect to the transverse direction of the magnetic tape T.

Figure 13:
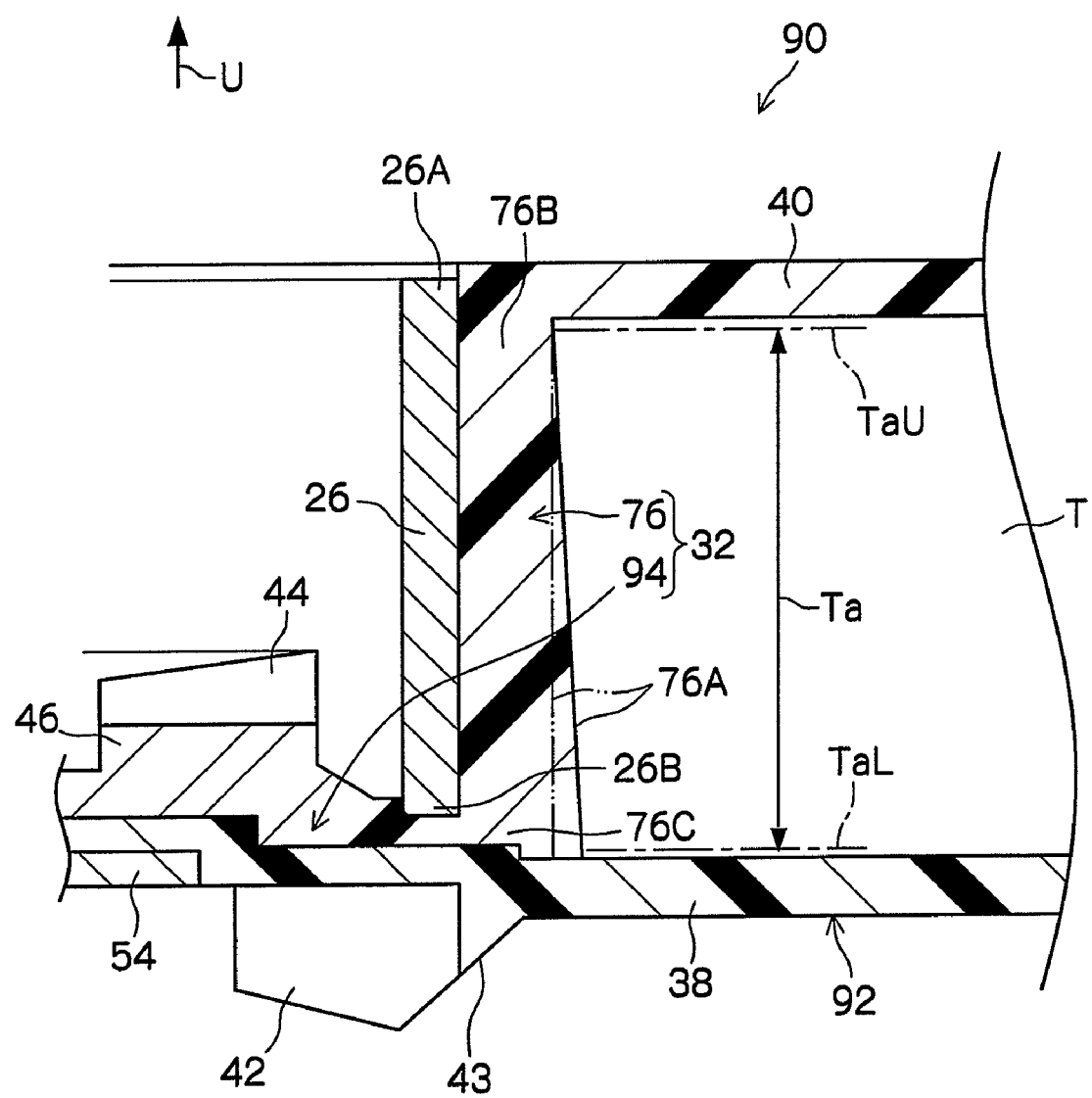
FIG. 13 is a side sectional view before winding, in which a portion of a reel relating to a third modified example of the exemplary embodiment of the present invention is enlarged.

The reel 90, which relates to the third modified example and is shown in FIG. 13, differs from the reel 80 with respect to the following points: the reel gear 42 is formed at and the reel plate 54 is fixed to a lower flange member 92 at which the lower flange 38 is formed, and the lower flange member 92 is fixed to a floor portion 94 of the reel hub 32. In this modified example as well, the tape winding surface 76A is formed in a substantial taper shape in which, before winding of the magnetic tape T onto the reel hub 32, the bottom end portion 76C has a larger diameter than the top end portion 76B as shown schematically in FIG. 13. Similarly, as shown by the imaginary line in FIG. 13, the tape winding surface 76A of the reel 80 is a structure which, in the state in which the magnetic tape T is wound, is substantially symmetrical with respect to the transverse direction of the magnetic tape T.

Note that, in the reel 80 and the reel 90 relating to the second and third modified examples, the cylindrical tube portion 34 in which the reinforcing ring 26 is embedded may be employed, and the reel hub 32 may be structured by the cylindrical tube portion 34 and the floor portion 36. Further, in the reels 75, 80, 90 that have the cylindrical tube portion 76, instead of the structure of insert molding the reinforcing ring 26 at the cylindrical tube portion 76 of the reel hub 32, it is possible to, for example, structure the reel 75 by fitting the reinforcing ring 26 with the cylindrical tube portion 76 of the reel hub 32 after molding.

In the above-described exemplary embodiment and modified examples, examples are described in which the tape winding surface 34C, 76A in the free state is formed in a substantial taper shape by varying the wall thicknesses at respective axial direction portions of the cylindrical tube portion 34, 76 of the reel hub 32, but the present invention is not limited to the same. For example, the tape winding surface 34C, 76A in the free state may be formed in a substantial taper shape with the wall thicknesses of the respective portions in the axial direction of the cylindrical tube portion 34, 76 of the reel hub 32 being substantially uniform (i.e., by forming the inner surface of the cylindrical tube portion 34, 76 in a taper shape corresponding to the tape winding surface 34C, 76A). In this case, the reinforcing ring 26 may be formed in the shape of a cylindrical tube as described above, or it is possible to form only the outer peripheral surface thereof in a taper shape, or to form both the inner and outer peripheral surfaces thereof in taper shapes.

Moreover, although the above-described exemplary embodiment and modified examples are structured such that the magnetic tape T is used as the recording tape, the present invention is not limited to the same. It suffices for the recording tape to be interpreted as an elongated-tape-shaped information recording/playback medium onto which information can be recorded and from which recorded information can be played-back. It goes without saying that the recording tape cartridge can be applied as well to recording tapes of any recording/playback systems.

Further, the above-described exemplary embodiment illustrates an example in which the reel 10 is applied to the recording tape cartridge 11. However, the present invention is not limited to the same, and can be applied to recording tape cartridges that, for example, accommodate, within a case, two reels for drawing-out and taking-up. It goes without saying that, in this case, it suffices for the present invention to be applied to at least one of the reels. Further, the present invention can also be applied to the take-up reel of a drive device, or the like.

What is claimed is:

1. A reel comprising:
   a hub formed in a cylindrical tube shape, and having an outer peripheral surface for winding of a recording tape; and
   a reinforcing ring for reinforcing the hub, the reinforcing ring being formed in a cylindrical tube shape and mounted at the hub,
   wherein the outer peripheral surface of the hub is formed so as to, in a state in which a recording tape is wound, form a shape that is symmetrical with respect to a central portion in a transverse direction of the recording tape, and
   wherein the hub is structured such that a radial direction rigidity of one axial direction side of the hub is lower than a radial direction rigidity of another axial direction side of the hub, and the outer peripheral surface is formed in a taper shape in which an outer diameter is greater at the one axial direction side than at the other axial direction side, and
   wherein a wall thickness of one axial direction of the hub is larger than a wall thickness of another axial direction side of the hub,
   wherein wall thickness of the hub varies gradually and continuously along a length of the hub to provide the larger wall thickness at the one axial direction side of the hub relative to the wall thickness at the another axial side direction of the hub, and wherein the one axial side and the other axial side are disposed at opposite end portions of the hub.

2. A reel according to claim 1, wherein the reinforcing ring is in a true cylindrical tube shape.

3. A reel according to claim 2, wherein the walls of the hub are disposed on outer surfaces of the reinforcing ring.

4. A reel comprising:
   a hub formed in a cylindrical tube shape, and having an outer peripheral surface for winding of a recording tape; and
   a reinforcing ring for reinforcing the hub, the reinforcing ring being formed in a cylindrical tube shape and mounted at the hub,
   wherein the outer peripheral surface of the hub is formed so as to, in a state in which a recording tape is wound, form a shape that is symmetrical with respect to a central portion in a transverse direction of the recording tape,
   wherein the hub is structured such that a radial direction rigidity of one axial direction side of the hub is lower than a radial direction rigidity of another axial direction side of the hub, and the outer peripheral surface is formed in a taper shape in which an outer diameter is greater at the one axial direction side than at the other axial direction side, wherein the hub is formed of a resin material, and the reinforcing ring is formed of a metal material, and
   wherein wall thickness of the hub varies gradually and continuously along a length of the hub to provide the larger wall thickness at the one axial direction side of the hub relative to the wall thickness at the another axial side direction of the hub, and wherein the one axial side and the other axial side are disposed at opposite end portions of the hub.

5. A reel comprising:
   a hub formed in a cylindrical tube shape, and having an outer peripheral surface for winding of a recording tape; and
   a reinforcing ring for reinforcing the hub, the reinforcing ring being formed in a cylindrical tube shape and mounted at the hub,
   wherein, in a state in which a recording tape is wound on the hub, diameters of portions of the outer peripheral surface of the hub, which portions contact both transverse direction ends of the recording tape, substantially coincide, and
   wherein wall thickness of the hub varies gradually and continuously along a length of the hub to provide the larger wall thickness at the one axial direction side of the hub relative to the wall thickness at the another axial side direction of the hub, and wherein the one axial side and the other axial side are disposed at opposite end portions of the hub.

6. The reel of claim 5, wherein the hub is structured such that a radial direction rigidity of one axial direction side of the hub is lower than a radial direction rigidity of another axial direction side of the hub, and the outer peripheral surface is formed in a taper shape in which an outer diameter is greater at the one axial direction side than at the other axial direction side.

7. The reel of claim 5, wherein the hub is formed of a resin material, and the reinforcing ring is formed of a metal material.

8. A reel comprising:
   a hub formed in a cylindrical tube shape, and having an outer peripheral surface for winding of a recording tape; and
   a reinforcing ring for reinforcing the hub, the reinforcing ring being formed in a cylindrical tube shape and mounted at the hub,
   wherein the outer peripheral surface of the hub is formed so as to, in a free state in which a recording tape is not wound, have different outer diameters in an axial direction such that, in a state in which a recording tape is wound, the outer peripheral surface of the hub forms a shape that is symmetrical with respect to a central portion in a transverse direction of the recording tape, and
   wherein the hub is structured such that a radial direction rigidity of one axial direction side of the hub is lower than a radial direction rigidity of another axial direction side of the hub, and the outer peripheral surface is formed in a taper shape in which an outer diameter is greater at the one axial direction side than at the other axial direction side, wherein a wall thickness of one axial direction of the hub is larger than a wall thickness of another axial direction side of the hub, and wherein wall thickness of the hub varies gradually and continuously along a length of the hub to provide the larger wall thickness at the one axial direction side of the hub relative to the wall thickness at the another axial side direction of the hub, and wherein the one axial side and the other axial side are disposed at opposite end portions of the hub.

9. The reel of claim 8, wherein the hub is formed of a resin material, and the reinforcing ring is formed of a metal material.

10. A reel comprising:

a hub formed in a cylindrical tube shape, and having an outer peripheral surface for winding of a recording tape; and a reinforcing ring for reinforcing the hub, the reinforcing ring being formed in a cylindrical tube shape and mounted at the hub, wherein the hub is formed so as to, in a free state in which a recording tape is not wound, have different outer diameters in an axial direction such that, in a state in which a recording tape is wound on the hub, outer diameters of one axial direction end portion and another axial direction end portion substantially coincide, and wherein wall thickness of the hub varies gradually and continuously along a length of the hub to provide the larger wall thickness at the one axial direction side of the hub relative to the wall thickness at the another axial side direction of the hub, and wherein the one axial side and the other axial side are disposed at opposite end portions of the hub.

11. The reel of claim 10, wherein the hub is structured such that a radial direction rigidity of one axial direction side of the hub is lower than a radial direction rigidity of another axial direction side of the hub, and the outer peripheral surface is formed in a taper shape in which an outer diameter is greater at the one axial direction side than at the other axial direction side.

12. The reel of claim 10, wherein the hub is formed of a resin material, and the reinforcing ring is formed of a metal material.

13. A reel comprising:

a hub formed in a cylindrical tube shape, and having an outer peripheral surface for winding of a recording tape; and a reinforcing ring for reinforcing the hub, the reinforcing ring being formed in a cylindrical tube shape and mounted at the hub, wherein the outer peripheral surface of the hub at which the reinforcing ring is mounted has different radial direction rigidities and outer diameters in an axial direction, and is formed such that, in a state in which a recording tape is not wound, the outer diameter at a side where the radial direction rigidity is low is greater than the outer diameter at a side where the radial direction rigidity is high, and wherein wall thickness of the hub varies gradually and continuously along a length of the hub to provide the larger wall thickness at the one axial direction side of the hub relative to the wall thickness at the another axial side direction of the hub, and wherein the one axial side and the other axial side are disposed at opposite end portions of the hub.

14. The reel of claim 13, wherein the hub is structured such that a radial direction rigidity of one axial direction side of the hub is lower than a radial direction rigidity of another axial direction side of the hub, and the outer peripheral surface is formed in a taper shape in which an outer diameter is greater at the one axial direction side than at the other axial direction side.

15. The reel of claim 13, wherein the hub is formed of a resin material, and the reinforcing ring is formed of a metal material.

16. A recording tape cartridge comprising:

a reel having: a hub formed in a cylindrical tube shape and having an outer peripheral surface for winding of a recording tape; and a reinforcing ring for reinforcing the hub, the reinforcing ring being formed in a cylindrical tube shape and mounted at the hub, and the outer peripheral surface of the hub is formed so as to, in a state in which a recording tape is wound, form a shape that is symmetrical with respect to a central portion in a transverse direction of the recording tape; and a case rotatably accommodating the reel;

wherein the hub is structured such that a radial direction rigidity of one axial direction side of the hub is lower than a radial direction rigidity of another axial direction side of the hub, and the outer peripheral surface is formed in a taper shape in which an outer diameter is greater at the one axial direction side than at the other axial direction side, wherein a wall thickness of one axial direction of the hub is larger than a wall thickness of another axial direction side of the hub, and wherein wall thickness of the hub varies gradually and continuously along a length of the hub to provide the larger wall thickness at the one axial direction side of the hub relative to the wall thickness at the another axial side direction of the hub, and wherein the one axial side and the other axial side are disposed at opposite end portions of the hub.

* * * * *